United States Patent
Kropp et al.

(10) Patent No.: US 12,435,163 B2
(45) Date of Patent: Oct. 7, 2025

(54) COMPOSITIONS COMPRISING ROMP CATALYST AND DISPERSANT, CARTRIDGES, AND METHODS

(71) Applicant: 3M INNOVATIVE PROPERTIES COMPANY, St. Paul, MN (US)

(72) Inventors: Michael A. Kropp, Cottage Grove, MN (US); Yangbin Chen, Lake Elmo, MN (US); Binhong Lin, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 511 days.

(21) Appl. No.: 17/912,576

(22) PCT Filed: Mar. 30, 2021

(86) PCT No.: PCT/US2021/024827
§ 371 (c)(1),
(2) Date: Sep. 19, 2022

(87) PCT Pub. No.: WO2021/202485
PCT Pub. Date: Oct. 7, 2021

(65) Prior Publication Data
US 2023/0135079 A1      May 4, 2023

Related U.S. Application Data

(60) Provisional application No. 63/003,338, filed on Apr. 1, 2020, provisional application No. 63/159,578, filed on Mar. 11, 2021.

(51) Int. Cl.
C08G 61/08        (2006.01)
B05C 17/005       (2006.01)
(Continued)

(52) U.S. Cl.
CPC ............. C08F 2/01 (2013.01); B05C 17/005 (2013.01); B05C 17/00596 (2013.01);
(Continued)

(58) Field of Classification Search
CPC ...... C08G 61/08; C08G 61/06; C09D 165/00; B01J 31/00; B01J 2231/48; B01J 2231/54;
(Continued)

(56) References Cited

U.S. PATENT DOCUMENTS

| | | | |
|---|---|---|---|
| 4,400,340 A | 8/1983 | Klosiewicz | |
| 4,426,502 A | 1/1984 | Minchak | |

(Continued)

FOREIGN PATENT DOCUMENTS

| | | | |
|---|---|---|---|
| CA | 2242060 A1 | 1/1999 | |
| WO | 2017068590 A1 | 4/2017 | |

(Continued)

OTHER PUBLICATIONS

Hintzer, Ullmann's Encyclopedia of Industrial Chemistry 7th Edition—Chapter: Fluoropolymers, Organic, 4-6 (2013).
(Continued)

*Primary Examiner* — Rip A Lee
(74) *Attorney, Agent, or Firm* — Carolyn A. Fischer

(57) ABSTRACT

A composition is described comprising a ring opening metathesis polymerization catalyst or precatalyst thereof; and an unreactive dispersant having a viscosity at 25° C. of at least 10 Pa·sec at a shear rate of 1 1/sec. Also described is a cartridge (e.g. or a dispensing and mixing apparatus) comprising such composition. The cartridge typically comprises a first chamber comprising unpolymerized cyclic olefin; and a second chamber comprising the catalyst and dispersant. Also described are compositions including two-part compositions and methods of bonding a substrate.

20 Claims, 3 Drawing Sheets

(51) Int. Cl.
*B05D 1/34* (2006.01)
*B43M 11/06* (2006.01)
*C08F 2/01* (2006.01)
*C08F 2/08* (2006.01)
*C08F 4/80* (2006.01)
*C08F 32/08* (2006.01)
*C08G 61/06* (2006.01)
*C09D 165/00* (2006.01)
*B01J 31/00* (2006.01)
*B05D 1/26* (2006.01)
*B05D 5/10* (2006.01)

(52) U.S. Cl.
CPC .............. *B43M 11/06* (2013.01); *C08F 2/08* (2013.01); *C08F 4/80* (2013.01); *C08F 32/08* (2013.01); *C08G 61/08* (2013.01); *B01J 31/00* (2013.01); *B01J 2231/48* (2013.01); *B01J 2231/54* (2013.01); *B05D 1/26* (2013.01); *B05D 1/34* (2013.01); *B05D 5/10* (2013.01); *C08G 61/06* (2013.01); *C09D 165/00* (2013.01)

(58) Field of Classification Search
CPC . B43M 11/06; B05D 5/10; B05D 1/34; B05D 1/26; B05C 17/00596; B05C 17/005
See application file for complete search history.

(56) References Cited

U.S. PATENT DOCUMENTS

| | | | | |
|---|---|---|---|---|
| 4,736,002 A * | 4/1988 | Allen | ............... | C08F 210/06 526/348 |
| 4,847,340 A * | 7/1989 | Allen | ............... | C08F 210/06 526/348 |
| 4,859,757 A * | 8/1989 | Pellon | ............... | C08F 210/06 526/348 |
| 4,943,621 A | 7/1990 | Janda et al. | | |
| 5,087,343 A | 2/1992 | Woodson et al. | | |
| 5,312,940 A | 5/1994 | Grubbs et al. | | |
| 5,722,829 A | 3/1998 | Wilcox et al. | | |
| 5,948,720 A * | 9/1999 | Sun | ............... | C08F 10/00 502/115 |
| 6,310,121 B1 | 10/2001 | Woodson, Jr. et al. | | |
| 6,586,536 B1 * | 7/2003 | Kelley | ............... | C08F 210/06 526/348 |
| 6,844,409 B2 * | 1/2005 | Angeletakis | ............... | C08G 77/20 526/171 |
| 6,872,792 B2 * | 3/2005 | Kendall | ............... | C08G 61/08 525/289 |
| 7,173,097 B2 * | 2/2007 | Angeletakis | ............... | C08G 61/00 526/171 |
| 7,566,747 B2 * | 7/2009 | Moore | ............... | B29C 73/22 523/210 |
| 7,645,843 B2 * | 1/2010 | Elovainio | ............... | C08F 10/00 526/919 |
| 7,943,234 B2 | 5/2011 | Lawin et al. | | |
| 8,669,330 B2 | 3/2014 | Stewart | | |
| 9,452,568 B2 * | 9/2016 | Corral | ............... | B29C 70/443 |
| 9,527,982 B2 * | 12/2016 | Cruce | ............... | C08K 5/29 |
| 9,598,531 B2 * | 3/2017 | Stephen | ............... | C08G 61/08 |
| 9,751,975 B2 * | 9/2017 | Cruce | ............... | C08G 61/08 |
| 9,796,889 B2 | 10/2017 | Giardello et al. | | |
| 9,803,046 B2 * | 10/2017 | Stephen | ............... | C08G 61/08 |
| 10,239,965 B2 | 3/2019 | Cruce et al. | | |
| 10,259,210 B2 * | 4/2019 | Vidavsky | ............... | B29C 64/112 |
| 10,344,118 B2 | 7/2019 | Allen et al. | | |
| 10,920,002 B2 * | 2/2021 | Moore | ............... | B29C 64/106 |
| 10,955,162 B2 * | 3/2021 | Gillette | ............... | G05D 23/1905 |
| 11,001,725 B2 * | 5/2021 | Vidavsky | ............... | B29C 64/112 |
| 11,118,004 B2 * | 9/2021 | Vidavsky | ............... | B29C 64/112 |
| 11,142,662 B2 * | 10/2021 | Burtovyy | ............... | C09D 11/108 |
| 11,179,879 B2 * | 11/2021 | Vidavsky | ............... | B33Y 10/00 |
| 11,230,566 B2 * | 1/2022 | Burtovyy | ............... | C07C 13/68 |
| 11,230,624 B2 * | 1/2022 | Burtovyy | ............... | B01J 31/2278 |
| 11,286,338 B2 * | 3/2022 | Rhodes | ............... | B33Y 10/00 |
| 11,299,573 B2 * | 4/2022 | Burtovyy | ............... | B29C 64/124 |
| 11,840,586 B2 * | 12/2023 | Appelhans | ............... | C08F 236/20 |
| 2008/0023884 A1 | 1/2008 | Konze et al. | | |
| 2010/0148903 A1 | 6/2010 | Yin et al. | | |
| 2014/0329017 A1 | 11/2014 | Wang et al. | | |
| 2014/0357820 A1 * | 12/2014 | Stephen | ............... | C08G 61/08 526/171 |

FOREIGN PATENT DOCUMENTS

| | | |
|---|---|---|
| WO | 2018045132 A1 | 3/2018 |
| WO | 2021074734 A1 | 4/2021 |
| WO | 2021074749 A1 | 4/2021 |
| WO | 2021091864 A1 | 5/2021 |
| WO | 2021124043 A1 | 6/2021 |
| WO | 2021124156 A1 | 6/2021 |
| WO | 2022/101746 A1 | 5/2022 |
| WO | 2022/219427 A1 | 10/2022 |

OTHER PUBLICATIONS

International Search Report for PCT International Application No. PCT/US2021/024827, mailed on Jun. 9, 2021, 4 pages.
Product Information: "3M Glass Bubbles K Series, S Series and iM Series", Products of 3M, 2013, 4 pages.
Video: 3M™ Scotch-Weld™ Structural Adhesives DP100 Plus and DP125, Jul. 2018, URL https://www.youtube.com/watch?v=_TmC8I3YBrc, 1 Page.

* cited by examiner

COMPOSITIONS COMPRISING ROMP CATALYST AND DISPERSANT, CARTRIDGES, AND METHODS

BACKGROUND

According to U.S. Pat. No. 10,239,965, "When the metal carbene olefin metathesis catalyst is added to the resin composition as a suspension, the metal carbene olefin metathesis catalyst is suspended in a dispersing carrier such as mineral oil, paraffin oil, soybean oil, tri-isopropylbenzene, or any hydrophobic liquid which has a sufficiently high viscosity so as to permit effective dispersion of the metal carbene olefin metathesis catalyst, and which is sufficiently inert and which has a sufficiently high boiling point so that is does not act as a low-boiling impurity in the olefin metathesis reaction."

SUMMARY

Industry would find advantage in compositions comprising a dispersant and ring opening metathesis polymerization catalyst or precatalyst thereof having improved properties. Higher viscosity dispersants are amenable to maintaining a more uniform distribution of the catalyst in the dispersant. Further, higher viscosity unreactive dispersants can be combined with the unpolymerized cyclic olefin at higher concentrations without diminishing the properties. Higher viscosity unreactive catalyst dispersants are also amenable to utilizing existing cartridges as well as dispensing and mixing apparatus that are currently used for two-part epoxy compositions. In some embodiments, the dispersant comprises a liquid or semi-solid hydrocarbon in the absence of a non-thixotropic filler. In some embodiments, the dispersant comprises a liquid or semi-solid hydrocarbon in combination with a non-thixotropic filler.

In one embodiment, a cartridge suitable for use with a dispensing and mixing apparatus is described comprising a first chamber comprising unpolymerized cyclic olefin; and a second chamber comprising a ring opening metathesis polymerization (ROMP) catalyst or precatalyst thereof; and an unreactive dispersant having a viscosity at 25° C. of at least 10 Pa·sec at a shear rate of 1 1/sec.

In some embodiments, the first and second chamber are connected to each other. In other embodiments, the first and second cartridge may be separate cartridges. The separate cartridges may be characterized as a kit. The kit may further comprise a dispensing and mixing apparatus (e.g. gun) and/or a dispensing (e.g. mixing) nozzle.

In another embodiment, a two-part composition is described comprising a first part comprising unpolymerized cyclic olefin; and a second part comprising a ring opening metathesis polymerization catalyst or precatalyst thereof; and an unreactive dispersant having a viscosity at 25° C. of at least 10 Pa·sec at a shear rate of 1 1/sec.

In another embodiment, a composition is described comprising a ring opening metathesis polymerization catalyst or precatalyst thereof; and an unreactive dispersant having a viscosity at 25° C. of at least 10 Pa·sec at a shear rate of 1 1/sec. Also described is a cartridge (e.g. for a dispensing and mixing apparatus) comprising such composition.

In another embodiment, a method of bonding a substrate is described comprising providing a two-part adhesive composition as described herein; applying the adhesive composition between a first and second a substrate; and polymerizing the cyclic olefin. In some embodiments, the two-part adhesive composition is provided in cartridges. In some embodiments, the step of applying comprises dispensing each part of the adhesive composition by means of force applied with plungers of a dispensing gun. Each part is typically conveyed through a dispensing (e.g. mixing) nozzle comprising a static mixing element.

DETAILED DESCRIPTION

Figure 1:
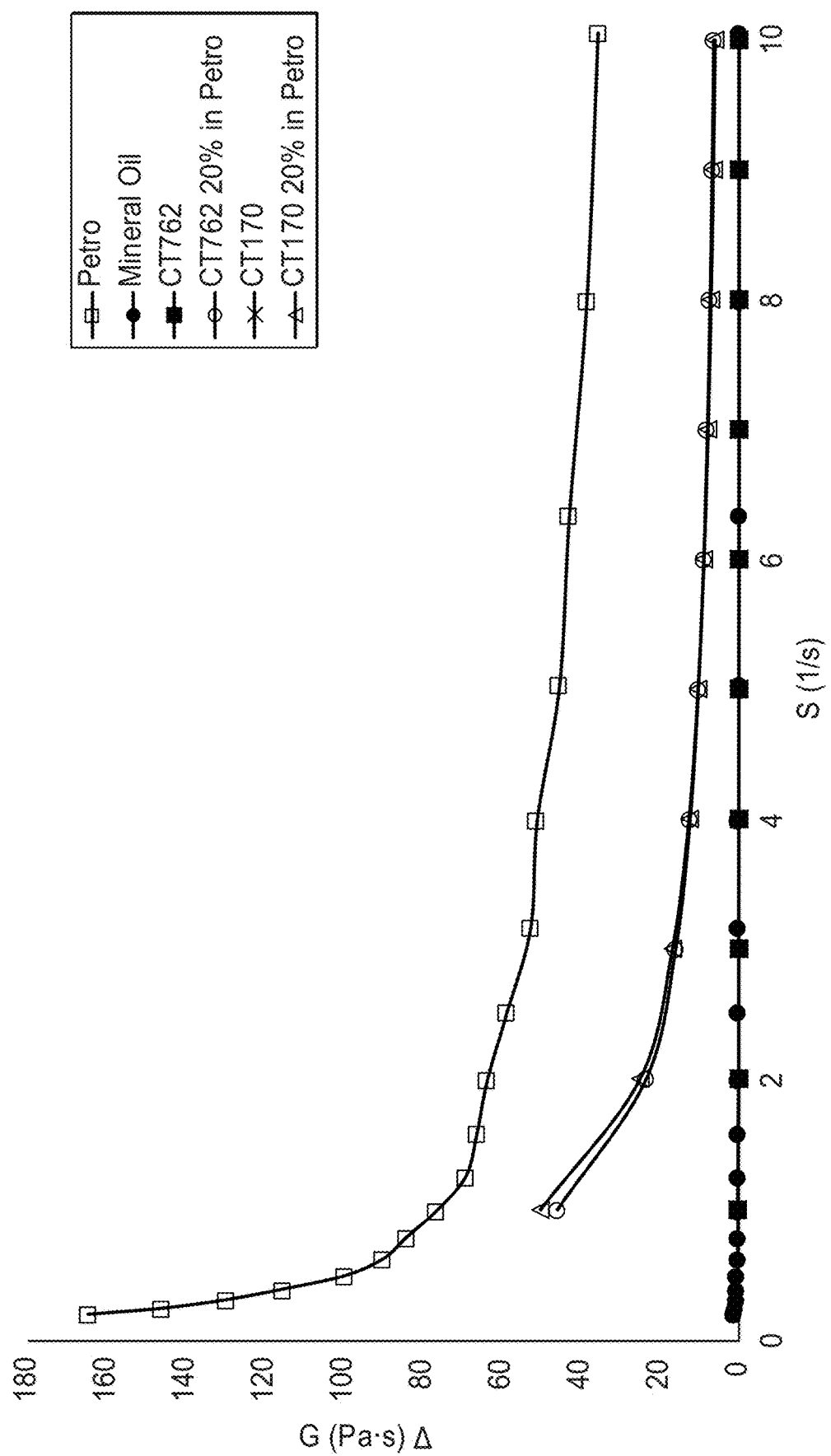
FIG. 1 is a viscosity curve of catalyst dispersants.

FIG. 1 is a viscosity curve of catalyst dispersants at shear rates ranging from 1 1/sec to 10 1/sec. Notably, mineral oil has a very low viscosity at shear rates ranging from 1 to 10 1/sec. When mineral oil is used as a dispersant (such as in the case of CT762 and CT170), the catalyst particles can settle out of the dispersant in a relatively short period of time, such an hour.

Presently described are compositions comprising a ring opening metathesis polymerization catalyst or precatalyst thereof and a higher viscosity unreactive dispersant. With reference to FIG. 1, notably such dispersants (e.g. Petro, CT762 20% in Petro, CT170 20% in Petro) have a viscosity at 25° C. of at least 1, 2, 3, 4, 5, 6, 7, 8, 9, or 10 Pa·sec at a shear rate of 1 1/sec. In some embodiments, the dispersant has a viscosity at 25° C. of at least 15, 20, 25, 30, 35, 40, 45, 50, 55, 60, 65, 70, or 75 Pa·sec at a shear rate of 1 1/sec. When the shear rate is less than 1 1/sec (e.g. 0.9, 0.8, 0.7, 0.6, 0.5, 0.4, 0.3, 0.2, 0.1) the viscosity of the dispersant can be at least 75, 100, 125, 150, or 175 Pa·sec at a shear rate of 1 1/sec. The dispersant typically has a viscosity at 25° C. no greater than 200,000 Pa·sec at a shear rate of 1 1/sec. In some embodiments, the dispersant has a viscosity at 25° C. no greater than 150,000 or 100,000 Pa·sec at a shear rate of 1 1/sec. In some embodiments, the dispersant has a viscosity at 25° C. no greater than 75,000; 50,000; 25,000; 10,000; 5,000 or 1,000 Pa·sec at a shear rate of 1 1/sec. In some embodiments, the dispersant has a viscosity at 25° C. no greater than 900, 800, 700, 600, 500, 400, 300, 200, or 100 Pa·sec at a shear rate of 1 1/sec. The viscosity at low shear rates is amenable to the dispersant having a sufficiently high viscosity to prevent the catalyst from settling out of the dispersant while being stored in a container, such as a chamber of a cartridge for a dispensing and mixing apparatus.

The dispersant is typically shear thinning, meaning the viscosity is significantly higher at low shear rates, e.g. 1 1/sec, than at high shear rates, e.g. 10 1/sec or greater. The viscosity at higher shear rates is amenable to the dispersant having a lower viscosity, e.g. more similar to the cyclin olefin composition, when the dispersant is subjected to higher shear forces. such as passing through a mixer nozzle typically comprising a static mixing element. In some embodiments, the dispersant has a viscosity at 25° C. of at least 15, 20, 25, 30, 35, or 40 Pa·sec at a shear rate of 10 1/sec. The dispersant typically has a viscosity at 25° C. no greater than 100,000 Pa·sec at a shear rate of 10 1/sec. In some embodiments, the dispersant has a viscosity at 25° C. no greater than 75,000 or 50,000 Pa·sec at a shear rate of 10 1/sec. In some embodiments, the dispersant has a viscosity at 25° C. no greater than 25,000; 10,000; 5,000 or 1,000 Pa·sec at a shear rate of 10 1/sec. In some embodiments, the dispersant has a viscosity at 25° C. no greater than 900, 800, 700, 600, 500, 400, 300, 200, or 100 Pa·sec at a shear rate of 10 1/sec.

The viscosity of the dispersant at 1 1/sec divided by the viscosity at 10 1/sec is one way to express the shear thinning behavior of the dispersant. In some embodiments, the viscosity of the dispersant at 1 1/sec divided by the viscosity at 10 1/sec is at least 1.5, 2, 2.5, 3, or 3.5. In some embodiments, the viscosity of the dispersant at 1 1/sec divided by the viscosity at 10 1/sec is no greater than 10, 9, 8, 7, 6, 5, 4, 3, or 1.

The viscosity of the dispersant can be measured according to the test method described in the examples.

The dispersant is "unreactive", meaning it is unreactive with the catalyst. When the dispersant is sufficiently unreactive, the Differential Scanning calorimetry onset temperature of the reaction of the unpolymerized cyclic olefin and dispersed catalyst is substantially the same after storage (e.g. 3 months at 25° C.) as compared to the same composition not subject to storage. The change in the onset temperature is typically less than 10, 9, 8, 7, 6, 5, 4, 3, 2, 1, or zero.

In some embodiments, the mixture of catalyst and dispersant may comprise other optional components such as adhesion promoters or additives. When optional components are present, the dispersant is also unreactive with such other optional components. The dispersant is also typically unreactive with the unpolymerized cyclic olefin of the first part of a two-part composition. In some embodiments, the first part may comprise other optional components such as adhesion promoters or additives. When optional components are present, the dispersant is also typically unreactive with such other optional components of the first part. However, since the first part is stored separately (e.g. in a separate chamber or cartridge), it is not a necessity that the dispersant is unreactive with respect to the first part comprising the unpolymerized cyclic olefin.

In some embodiments, the dispersant may be characterized as a hydrocarbon dispersant. A hydrocarbon consisting entirely of hydrogen and carbon. The four classes of hydrocarbons include alkane, alkenes, alkynes and aromatic. The structure of hydrocarbons can be linear, branched, or cyclic.

In typical embodiments, the dispersant is an aliphatic hydrocarbon and thus comprises little or no aromatic moieties. For example, the aromatic moieties are typically less than 5, 4, 3, 2, or 1 wt. % of the dispersant. Further, although the catalysts are primarily reactive with cyclic olefin such catalysts may also be reactive to some extent with linear or branched olefins. Thus, in typical embodiments, the hydrocarbon comprises little or no unsaturated moieties. For example, the unsaturated moieties are less than 5, 4, 3, 2, or 1 wt. % of the dispersant. In typical embodiments, the dispersant is a mixture of various chain length of alkanes.

One illustrative dispersant for the ROMP catalyst or precursor thereof is petrolatum. Petrolatum (CAS #8009-03-8) is a semi-solid mixture of hydrocarbons (with carbon numbers mainly higher than 25). In this embodiment, the (e.g. petrolatum) dispersant is a semi-solid at room temperature, having a melting point greater than 25° C. In some embodiments, the melting point is at least 30 or 35° C. In some embodiments, the melting point is no greater than 60° C.

Another illustrative dispersant is a mixture of a higher viscosity dispersant (e.g. petrolatum) with a low viscosity dispersant, such as mineral oil. The low viscosity dispersant typically has a viscosity at least 5-10 times lower than the higher viscosity dispersant (e.g. petrolatum) at 25° C. a shear rate of 1 1/sec. When the shear rate is less than 1 1/sec (e.g. 0.9, 0.8, 0.7, 0.6, 0.5, 0.4, 0.3, 0.2, 0.1) the viscosity of the low viscosity dispersant is typically less than 75, 50, 25, 20, 15, 10 or 5 Pa·sec at a shear rate of 1 1/sec.

In this embodiment, the amount by weight of higher viscosity dispersant (e.g. petrolatum) is typically greater than or equal to the amount of low viscosity dispersant (e.g. mineral oil). Thus, the weight ratio of higher viscosity dispersant (e.g. petrolatum) to low viscosity dispersant (e.g. mineral oil) is 1:1 or greater. In some embodiments, the weight ratio of higher viscosity dispersant (e.g. petrolatum) to low viscosity dispersant (e.g. mineral oil) is no greater than 20:1. In some embodiments, the weight ratio of higher viscosity dispersant (e.g. petrolatum) to low viscosity dispersant (e.g. mineral oil) is at least 1.2:1, 1.5:1, 2:1, 3:1, 4:1, 5:1, 6:1, 7:1, 8:1, 9:1. or 10:1. As depicted in FIG. 1, the inclusion of low viscosity dispersant (e.g. mineral oil) can reduce the viscosity at both shear rates of 1 1/sec and 10 1/sec.

Mineral oil (CAS #8042-47-4) is a liquid by-product of the distillation of petroleum. It is a transparent, colorless oil composed mainly of alkanes (typically 15 to 40 carbons) and cyclic paraffins. As greater proportions of higher molecular mass hydrocarbons are added to the mineral oil mixture, the melting point of the oil increases.

Petrolatum differs from mineral oil in that it has a broader molecular weight distribution including a higher amount of alkanes having a molecular weight ranging from 1,000 g/mole to 5.000 g/mole. In some embodiments, the petrolatum comprises alkane having a molecular weight of at least 2,000 or 3,000 g/mole.

In some embodiments, the unreactive (e.g. hydrocarbon) dispersant has a number average molecular weight of at least 650, 700, 750, 800, or 850 g/mole. The number average molecular weight is typically no greater than 1500, 1400, 1300, 1200, or 1000 g/mole.

In some embodiments, the unreactive (e.g. hydrocarbon) dispersant has a weight average molecular weight of at least 750, 800, 850, 900, 950, 1000, 1100, or 1200 g/mole. The number average molecular weight is typically no greater than 10,000; 9,000; 8,000; 7,000; 6,000 or 5,000 g/mole. In some embodiments, the number average molecular weight is no greater than 2500, 2000, or 1500 g/mole.

In some embodiments, the unreactive (e.g. hydrocarbon) dispersant has a polydispersity of at least 1.2, 1.25, 1.3, or 1.35. In some embodiments, the polydispersity is no greater than 1.5.

The molecular weight can be measured by gel permeation chromatography according to ASTM D6579-11 using polystyrene molecular weight standards and tetrahydrofitran as the eluent.

The unreactive (e.g. hydrocarbon) dispersant can function as a plasticizer. In the case of adhesive composition, the amount of unreactive (e.g. hydrocarbon) dispersant is typically no greater than 20% by volume and in some embodiments less than 10% by volume, based on the total amount of the two-part composition. However, in the case of sealants, the composition may comprise up to 25, 30, 35, 40, 45, or 50% by volume of unreactive (e.g. hydrocarbon) dispersant, based on the total amount of the two-part composition.

The first part of the (e.g. adhesive) compositions described herein comprise one or more unpolymerized cyclic olefins. The cyclic olefins are generally mono-unsaturated (i.e. mono-olefin) or poly-unsaturated (i.e. comprising two or more carbon-carbon double bonds or in other words alkene groups). The double bond or in other words ethylenic unsaturation is not part of a (meth)acrylate or vinyl ether group. The cyclic olefin may be mono- or poly-cyclic (i.e.

comprising two or more cyclic groups). The cyclic olefin may generally be a strained or unstrained cyclic olefin, provided the cyclic olefin is able to participate in a ROMP reaction either individually or as part of a ROMP cyclic olefin composition.

The polymerizable (e.g. adhesive) composition comprise cyclic diene monomers, including for example 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, norbornadiene, cyclohexenylnorbornene, including oligomers thereof such as dimers, trimers, tetramers, pentamers, etc. The polyolefin cyclic materials are amenable to thermosetting.

In some embodiments, the polymerizable (e.g. adhesive) composition comprises dicyclopentadiene (DCPD), depicted as follows:

Various DCPD suppliers and purities may be used such as Lyondell 108 (94.6% purity), Veliscol UHP (99+% purity), Cymetech Ultrene (97% and 99% purities), and Hitachi (99+% purity).

In some embodiments, the composition comprises cyclopentadiene oligomers including trimers, tetramers, pentamers, and the like; depicted as follows:

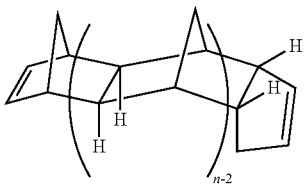

cyclopentadiene oligomers, n is typically 3, 4 or 5.

In some embodiments, the composition comprises cyclic diene monomer in the absence of mono-olefins.

In other embodiments, the composition further comprises a cyclic mono-olefin. Examples include cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

In some embodiments, the composition further comprises norbornene, depicted as follows:

Suitable norbornene monomers include substituted norbornenes such as norbornene dicarboxylic anhydride (nadic anhydride); and as well as alkyl and cycloalkyl norbornenes including butyl norbornene, hexyl norbornene, octyl norbornene, decyl norbornene, and the like.

The cyclic olefin monomers and oligomers may optionally comprise substituents provided the monomer, oligomer, or mixture is suitable for metathesis reactions. The carbon atoms of the cyclic olefin moiety may optionally comprise substituents derived from radical fragments including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the olefin may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carbodiimide, carboalkoxy, carbamate, halogen, or pseudohalogen. Similarly, the olefin may be substituted with one or more groups such as C1-C20 alkyl, aryl, acyl, C1-C20 alkoxide, aryloxide, C3-C20 alkyldiketonate, aryldiketonate, C1-C20 carboxylate, arylsulfonate, C1-C20 alkylsulfonate, C1-C20 alkylthio, arylthio, C1-C20 alkylsulfonyl, C1-C20 alkylsulfinyl, C-C20 alkylphosphate, and arylphosphate.

Preferred cyclic olefins can include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. More preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

The cyclic olefins may be used alone or mixed with each other in various combinations to adjust the properties of the olefin monomer composition. For example, mixtures of cyclopentadiene dimer and trimers offer a reduced melting point and yield cured olefin copolymers with increased mechanical strength and stiffness relative to pure poly-DCPD. As another example, incorporation of norbornene, or alkyl norbornene comonomers tend to yield cured olefin copolymers that are relatively soft and rubbery.

In some embodiments, the cyclic olefin material comprises a mixture of DCPD monomer and cyclopentadiene oligomer. In some embodiments, the mixture comprises at least 25, 30, 35, 40 or 45 wt. % DCPD based on the total amount of cyclic olefin monomer(s) and oligomer(s). In some embodiments, the mixture comprises no greater than 75, 70, 65, 60, 55, or 50 wt. % DCPD based on the total amount of cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount a cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount of cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer.

In some embodiments, the cyclic olefin material comprises a mixture of DCPD monomer and cyclopentadiene oligomer, in the absence of mono-olefins or in combination with a low concentration of mono-olefin. In this embodiment, the amount of mono-olefin is less than 25, 20, 15, 10, 9, 8, 7, 6, 5, 4, 3, 2, or 1 wt. % based on the total amount of cyclic olefin monomer(s) and oligomer(s).

In other embodiments, the mixture comprises at least 25, 30, 35, 40 or 45 wt. % of a mono-olefin such as a substituted norbornene, based on the total amount of cyclic olefin monomer(s) and oligomer(s). In some embodiments, the mixture comprises no greater than 75, 70, 65, 60, 55, or 50 wt. % mono-olefin (e.g. C4-C12 (e.g. C8) alkyl norbornene) based on the total amount of cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount a cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount of cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer. In some embodiments, the mixture comprises no greater than 5, 4, 3, 2, or 1 wt. % of DCPD monomer. In other embodiments, the mixture comprises no greater than 25 or 20 wt. % of DCPD monomer.

The (e.g. adhesive) composition comprises at least 10, 11, 12, 14, or 15 wt. % of cyclic olefin (i.e. polyolefin and optional mono-olefin) of the sum of cyclic olefin(s) and polymer. In some embodiments, the amount of cyclic olefin is at least 16, 17, 18, 19, or 20 wt. % of the sum of cyclic olefin(s) and polymer. In some embodiments, the amount of cyclic olefin is at least 25, 30, 35, 40, 45, or 25 wt. % of the sum of cyclic olefin(s) and polymer. The amount of cyclic olefin (i.e. polyolefin and optional mono-olefin) is typically no greater than 80 wt. % of the sum of cyclic olefin(s) and polymer. In some embodiments, the amount of cyclic olefin is no greater than 75, 70, 55, 60, 55, or 50 wt. % of the sum or cyclic olefin(s) and polymer.

Various cyclic olefins are commercially available from Materia.

The (e.g. adhesive) compositions described herein are prepared by the metathesis of cyclic olefins polymerized with a metal carbene catalyst. Group 8 transition metals, such as ruthenium and osmium, carbene compounds have been described as effective catalysts for ring opening metathesis polymerization (ROMP). See for example U.S. Pat. No. 10,239,965; incorporated herein by reference.

In typical embodiments, the catalyst is a metal carbene olefin metathesis catalyst. Such catalysts typically have the following structure:

(Catalyst Formula I)

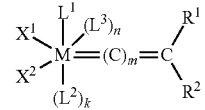

wherein
M is a Group 8 transition metal;
$L^1$, $L^2$, and $L^3$ are independently neutral electron donor ligands;
n is 0 or 1;
m is 0, 1, or 2;
k is 0 or 1;
$X^1$ and $X^2$ are independently anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups.

Typical metal carbene olefin metathesis catalysts contain Ru or Os as the Group 8 transition metal, with Ru being preferred.

A first group of metal carbene olefin metathesis catalysts are commonly referred to as First Generation Grubbs-type catalysts and have the structure of Catalyst Formula (I). For the first group of metal carbene olefin metathesis catalysts, M is a Group 8 transition metal, m is 0, 1, or 2, and n, $X^1$, $X^2$, $L^1$, $L^2$, and $L^3$ are described as follows.

For the first group of metal carbene olefin metathesis catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Typical trisubstituted phosphines are of the formula $PR^{H1}R^{H2}R^{H3}$, where $R^{H1}$, $R^{H2}$, and $R^{H3}$ are each independently substituted or unsubstituted aryl or C1-C10 alkyl, particularly primary alkyl, secondary alkyl, or cycloalkyl. In some embodiments, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine ($P$-o-$tolyl_3$), tri-tert-butylphosphine ($P$-tert-$Bu_3$), tricyclopentylphosphine ($PCyclopentyl_3$), tricyclohexylphosphine ($PCy_3$), triisopropylphosphine ($P$-i-$Pr_3$), trioctylphosphine ($POct_3$), triisobutylphosphine, ($P$-i-$Bu_3$), triphenylphosphine ($PPh_3$), tri(pentafluorophenyl)phosphine ($P(C_6F_5)_3$), methyldiphenylphosphine ($PMePh_2$), dimethylphenylphosphine (PMe$_2$Ph), and diethylphenylphosphine (PEt$_2$Ph). Alternatively, L$^1$ and L$^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like.

X$^1$ and X$^2$ are anionic ligands, and may be the same or different, or are linked together to form a cyclic group, typically although not necessarily a five- to eight-membered ring. In some embodiments, X$^1$ and X$^2$ are each independently hydrogen, halide, or one of the following groups: C1-C20 alkyl, C5-C24 aryl, C1-C20 alkoxy, C5-C24 aryloxy, C2-C20 alkoxycarbonyl, C6-C24 aryloxycarbonyl, C2-C24 acyl, C2-C24 acyloxy, C1-C20 alkylsulfonato, C5-C24 arylsulfonato, C1-C20 alkylsulfanyl, C5-C24 arylsulfanyl, C1-C20 alkylsulfinyl, NO$_3$, —N=C=O, —N=C=S, or C$_5$-C$_{24}$ arylsulfinyl. Optionally, X$^1$ and X$^2$ may be substituted with one or more moieties selected from C1-C12 alkyl, C1-C12 alkoxy, C5-C24 aryl, and halide, which may, in turn, with the exception of halide, be further substituted with one or more groups selected from halide, C1-C6 alkyl, C1-C6 alkoxy, and phenyl. In some embodiments, X$^1$ and X$^2$ are halide, benzoate, C2-C6 acyl, C2-C6 alkoxycarbonyl, C1-C6 alkyl, phenoxy, C1-C6 alkoxy, C1-C6 alkylsulfanyl, aryl, or C1-C6 alkylsulfonyl. In some preferred embodiments, X$^1$ and X$^2$ are each halide, CF$_3$CO$_2$, CH$_3$CO$_2$, CFH$_2$CO$_2$, (CH$_3$)$_3$CO, (CF$_3$)$_2$(CH$_3$)CO, (CF$_3$)(CH$_3$)$_2$CO, PhO, MeO, EtO, tosylate, mesylate, or trifluoromethane-sulfonate. In some preferred embodiments, X$^1$ and X$^2$ are each chloride.

R$^1$ and R$^2$ are independently selected from hydrogen, hydrocarbyl (e.g., C1-C20 alkyl, C2-C20 alkenyl, C2-C20 alkynyl, C5-C24 aryl, C6-C24 alkaryl, C6-C24 aralkyl, etc.), substituted hydrocarbyl (e.g., substituted C1-C20 alkyl, C2-C20 alkenyl, C2-C20 alkynyl, C5-C24 aryl, C6-C24 alkaryl, C6-C24 aralkyl, etc.), heteroatom-containing hydrocarbyl (e.g., heteroatom-containing C1-C20 alkyl, C2-C20 alkenyl, C2-C20 alkynyl, C5-C24 aryl, C6-C24 alkaryl, C6-C24 aralkyl, etc.), and substituted heteroatom-containing hydrocarbyl (e.g., substituted heteroatom-containing C1-C20 alkyl, C2-C20 alkenyl, C2-C20 alkynyl, C5-C24 aryl, C6-C24 alkaryl, C6-C24 aralkyl, etc.), and functional groups. R$^1$ and R$^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In some embodiments, R$^1$ is C1-C6 alkyl, C2-C6 alkenyl, and C5-C14 aryl.

In some embodiments, R$^2$ is phenyl, vinyl, methyl, isopropyl, or t-butyl, optionally substituted with one or more moieties selected from C1-C6 alkyl, C1-C6 alkoxy, phenyl, and a functional group Fn. Suitable functional groups ("Fn") include phosphonato, phosphoryl, phosphanyl, phosphino, sulfonato, C1-C20 alkylsulfanyl, C5-C20 arylsulfanyl, C1-C20 alkylsulfonyl, C5-C20 arylsulfonyl, C1-C20 alkylsulfinyl, C5-C20 arylsulfinyl, sulfonamido, amino, amido, imino, nitro, nitroso, hydroxyl, C1-C20 alkoxy, C5-C20 aryloxy, C2-C20 alkoxycarbonyl, C5-C20 aryloxycarbonyl, carboxyl, carboxylato, mercapto, formyl, C1-C20 thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge).

In some embodiments, R$^2$ is phenyl or vinyl substituted with one or more moieties selected from methyl, ethyl, chloro, bromo, iodo, fluoro, nitro, dimethylamino, methyl, methoxy, and phenyl. In some favored embodiments, R$^2$ is phenyl or —CH=C(CH$_3$)$_2$.

In some embodiments, one or both of R$^1$ and R$^2$ may have the structure —(W)$_n$-U$^+$V$^-$, wherein W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, R$^1$ and R$^2$ may be taken together to form an indenylidene moiety, such as phenylindenylidene.

In some embodiments, any one or more of X$^1$, X$^2$, L$^1$, L$^2$, L$^3$, R$^1$ and R$^2$ may be attached to a support or two or more (e.g. three or four) of said groups can be bonded to one another to form one or more cyclic groups, including bidentate or multidentate ligands, as disclosed, for example, in U.S. Pat. No. 5,312,940, incorporated herein by reference. When two or more of X$^1$, X$^2$, L$^1$, L$^2$, L$^3$ R$^1$ and R$^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

Other metal carbene olefin metathesis catalysts, commonly referred to as Second or Third Generation Grubbs-type catalysts, have the structure of Catalyst Formula (I), wherein L$^1$ is a carbene ligand having the structure of formula (II)

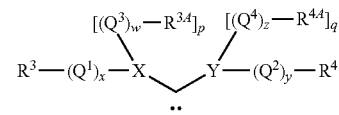

wherein M, m, n, X$^1$, X$^2$, L$^2$, L$^3$, R$^1$ and R$^2$ are as previously defined Formula I;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

Q$^1$, Q$^2$, Q$^3$, and Q$^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or —(CO)—, and w, x, y, and z are independently zero or 1, meaning that each linker is optional. Preferably, w, x, y, and z are all zero. Further, two or more substituents of adjacent atoms within Q$^1$, Q$^2$, Q$^3$, and Q$^4$ may be linked to form an additional cyclic group;

R$^3$, R$^{3A}$, R$^4$, and R$^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, L$^2$ and L$^3$ may be taken together to form a single bindentate electron-donating heterocyclic ligand. Furthermore, $R^1$ and $R^2$ may be taken together to form an indenylidene moiety, preferably phenylindenylidene. Moreover, $X^1$, $X^2$, $L^2$, $L^3$, X and Y may be further coordinated to boron or to a carboxylate;

Any two or more of $X^1$, $X^2$, $L^1$, $L^2$, $L^3$, $R^1$, $R^2$ $R^3$, $R^{3A}$, $R^4$, $R^{4A}$, $Q^1$, $Q^2$, $Q^3$, and $Q^4$ can be bonded to one another to form one or more cyclic groups or can also be taken to be -A-Fn, wherein "A" is a divalent hydrocarbon moiety and Fn is a functional group as previously described. Further, with the exception of $L^1$ such groups may be bonded to a support.

A particular class of such carbene are commonly referred to as N-heterocyclic carbene (NHC) ligands.

Examples of N-heterocyclic carbene (NHC) ligands and acyclic diaminocarbene ligands suitable as L1 thus include, but are not limited to, the following where DIPP or DiPP is diisopropylphenyl and Mes is 2,4,6-trimethylphenyl:

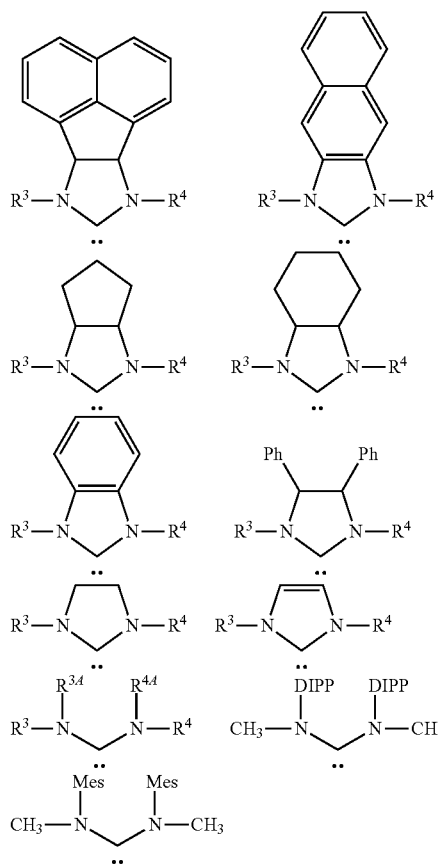

Representative metal carbene olefin metathesis catalysts include for example bis(tricyclohexylphosphine) benzylidene ruthenium dichloride, bis(tricyclohexylphosphine) dimethylvinylmethylidene ruthenium dichloride, bis(tricyclopentylphosphine) dimethylvinylmethylidene ruthenium dichloride, (tricyclohexylphosphine)(1,3-dimesityl-4,5-dihydroimidazol-2-ylidene) benzylidene ruthenium dichloride, (tricyclopentylphosphine)(1,3-dimesityl-4,5-dihydroimidazol-2-ylidene) dimethylvinylmethylidene ruthenium dichloride, (tricyclohexylphosphine)(1,3-dimesityl-4,5-dihydroimidazol-2-ylidene) dimethylvinylmethylidene ruthenium dichloride, (tricyclohexylphosphine)(1,3-dimesitylimidazol-2-ylidene) benzylidene ruthenium dichloride, (tricyclopentylphosphine)(1,3-dimesitylimidazol-2-ylidene) dimethylvinylmethylidene ruthenium dichloride, and (tricyclohexylphosphine)(1,3-dimesitylimidazol-2-ylidene) dimethylvinylmethylidene ruthenium dichloride.

Numerous metal carbene olefin metathesis catalysts are known, such as described in previously cited U.S. Pat. No. 10,239,965.

In some embodiments, the (e.g. adhesive) compositions described herein are two-part compositions wherein the catalyst is separated from the cyclic olefin until the time of use.

In some embodiments, the catalyst may be a latent ring opening metathesis polymerization catalyst. Such catalysts exhibit little or no catalytic activity (e.g. polymerization of the cyclic olefin) for at least 24 hours at room temperature. In some embodiments, the catalyst or precatalyst thereof is sufficiently latent such that after at least 1 hour (e.g. 4, 8, 12, 24 hours) at 25° C., the composition (i.e. mixture of cyclic olefin and catalyst) is sufficiently flowable at 25° C. for the desired adhesive or sealant application method. In some embodiments, the viscosity at 25° C. is no greater than 250,000; 200,000, 150,000; 100,000; 50,000, or 25,000 cps as measured with a Brookfield viscometer after at least 1 hour (e.g. 4, 8, 12, 24 hours) at 25° C. Latent ring opening metathesis polymerization catalysts can be triggered or in other words activated with heat (i.e. thermal activation), actinic (e.g. ultraviolet) radiation, a chemical compound, or a combination thereof.

In some embodiments, the latent ring opening polymerization catalysts are activated by a combination of actinic (e.g. ultraviolet) radiation and an acid compound. In some embodiments, a modified First or Second Generation Grubbs' catalyst as previously described can function as a latent catalyst. One representative latent catalyst is depicted as follows:

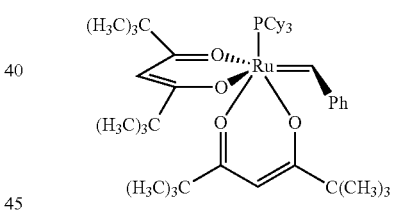

Such catalyst can be activated with an acid, such as a photoacid generator ("PAG"), as depicted in the following reactive scheme:

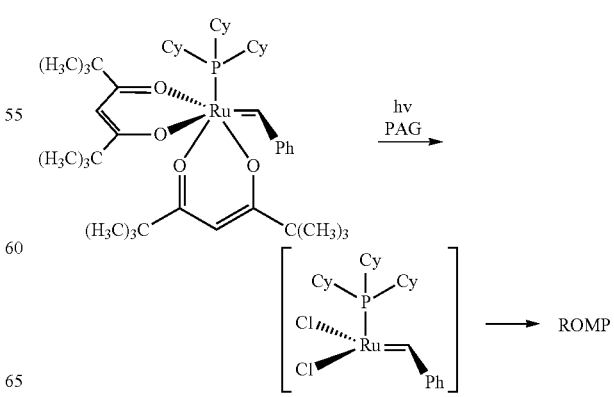

Another class of latent catalysts comprise a carbyne, i.e. a (e.g. Ru) metal carbon triple bond (also described in the literature as (e.g. Ru) metal carbides). These catalysts can be characterized as a ring opening metathesis polymerization precatalysts because such catalysts form a ring opening metathesis polymerization catalyst when reacted with an acid, such as a photoacid generator, as depicted in the following representative reactive scheme:

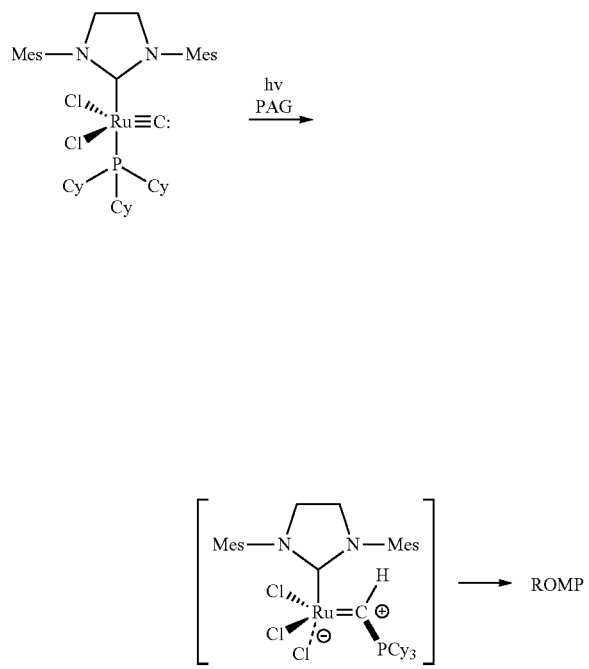

Such ring opening metathesis polymerization precatalysts can have the general formula:

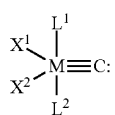

wherein $L^1$ is a carbene ligand having the structure of formula (II)

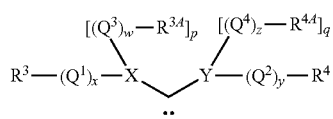

wherein M, $X^1$, $X^2$, and $L^2$ are as previously defined for Formula I. In some embodiments, $X^1$ and $X^2$ are chlorine. In some embodiments, $L^2$ is $PCy_3$.

In other embodiments, the latent catalyst can be activated by actinic (e.g. UV) energy in the absence of an acid compound. One class of compounds may be characterized as Fischer-type ruthenium carbene catalysts, such as described in WO2018/045132; incorporated herein by reference. Such catalysts have the following formula or a geometric isomer thereof

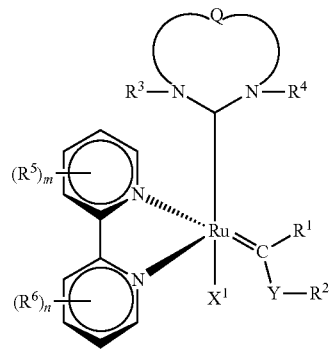

wherein $X^1$ and $X^2$ are independently anionic ligands;
Y is O, N—$R^1$, or S; and
Q is a two-atom linkage having the structure —$CR^{11}$—$R^{12}$—$CR^{13}$—$R^{14}$— or —$C^{11}$=$CR^{13}$—; wherein, $R^{11}$, $R^{12}$, $R^{13}$, and $R^{14}$ are independently hydrogen, hydrocarbyl, or a substituted hydrocarbyl;
$R^1$ and $R^2$ independently hydrogen, (optionally substituted) hydrocarbyl, or may be linked together to form an (optionally substituted) cyclic aliphatic group;
$R^3$ and $R^4$ are independently (optionally substituted) hydrocarbyl, and
$R^5$ $R^6$ are independently H, C1-24 alkyl, C1-24 alkoxy, C1-24 fluoroalkyl, C1-24 fluoroalkoxy, C1-24 alkylhydroxy, C1-24 alkoxyhydroxy, C1-24 fluoroalkylhydroxy(including perfluoroalkylhydroxy),
C1-24 fluoroalkoxyhydroxy, halo, cyano, nitro, or hydroxy; and
m and n are independently 1, 2, 3, or 4.

In some embodiments, the moiety

is a N-heterocyclic carbene (NHC) ligand as described above. Other N-heterocyclic carbene (NHC) ligands include:

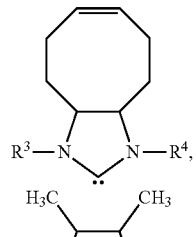 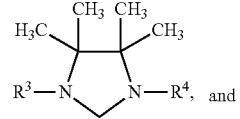

In one embodiment, the metathesis catalyst comprises a compound having the structure:

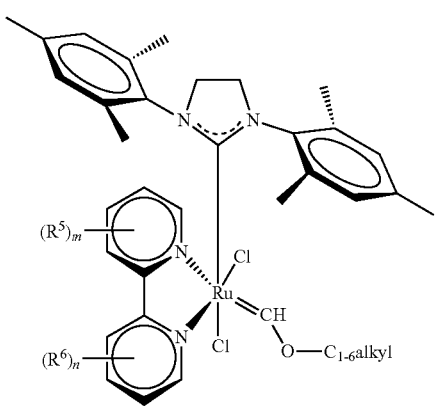

Actinic radiation activated catalyst can be preferred for bonding heat sensitive substrates comprised of organic polymeric materials. However, for bonding other substrates, the latent catalysts may be heat activated. In typical embodiments, the heat activation temperature is well above room temperature. For example, the heat activation temperature is at least 50, 60, 70, 80, 90 or 100° C. The heat activation temperature may range up to 130, 140, or 150° C. In one embodiment, thermally latent catalysts includes isomers that are inactive at room temperature yet active at temperatures ranging from 50° C. to 90° C. One representative catalyst is as follows:

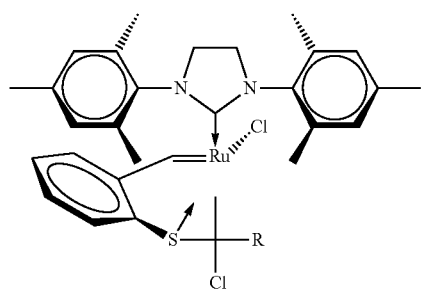

Another class of heat activatable catalyst comprises chelating alkylidene ligands. Some representative catalysts include:

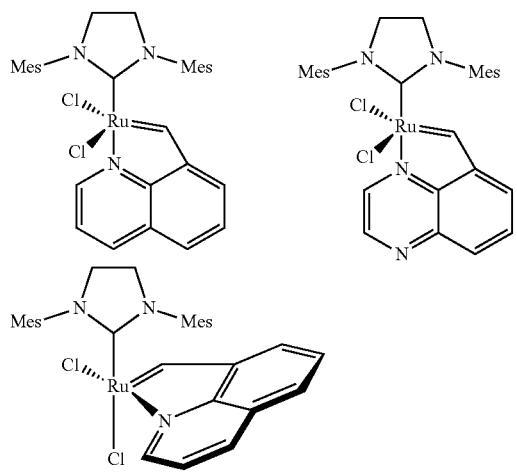

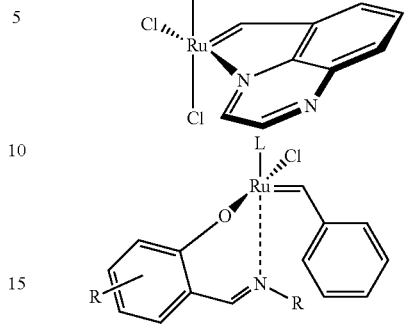

The composition typically comprises the ring opening metathesis polymerization catalyst or precursor thereof in an amount ranging from about 0.0001 wt. % to 2 wt. % catalyst based on the total weight of the composition. In some embodiments, the composition typically comprises at least 0.0005, 0.001, 0.005, 0.01, 0.05, 0.10, 0.15 or 0.20 wt. % catalyst. In some embodiments, the composition typically comprises no greater than 1.5, 1, 0.5, 0.1 wt. % catalyst.

The concentration of the ring opening metathesis polymerization catalyst or precursor thereof in the second part is based on the volume ratio of the cartridge. For example, when the cartridge is a 10 (first part):1(second part), the second part contains about 11 times the amount of catalyst based on the total weight of the second part. As yet another example, when the cartridge is a 4(first part):1(second part), the second part contains about 5 times the amount of catalyst based on the total weight of the second part.

In some embodiments, the activation of the latent olefin metathesis catalyst is achieved by the addition of acid, photoacid generator ("PAG"), or thermal acid generator ("TAG") and exposing the composition to (e.g. ultraviolet) actinic radiation as described in patent applications 62/951,013 and 62/951,037; incorporated herein by reference. When present, the acid, photoacid or thermal acid generator is typically present in the (e.g. adhesive) composition in an amount of at least 0.005 or 0.01 wt. % and typically no greater than 10 wt. % of the composition. In some embodiments, the concentration is no greater than 5, 4, 3, 2, 1, or 0.5 wt. % of the (e.g. adhesive) composition. Alternatively the acid, photoacid generator ("PAG"), or thermal acid generator ("TAG") can be applied to the substrate the (e.g. adhesive) composition is applied to. When the (e.g. adhesive) composition further comprises an acid, photoacid or thermal acid generator, such acidic component is typically present in the first part of the composition comprising the unpolymerized cyclic olefin.

Suitable ROMP catalysts or precatalysts can polymerize the cyclic olefin via thermal curing, exposure to actinic (e.g. UV) radiation, or a combination thereof.

The composition may optionally further comprise a rate modifier such as, for example, triphenylphosphine (TPP), tricyclopentylphosphine, tricyclohexylphosphine, triisopropylphosphine, trialkylphosphites, triarylphosphites, mixed phosphites, pyridine, or other Lewis base. The rate modifier may be added to the cyclic olefin component to retard or accelerate the rate of polymerization as required. The amount of rate modifier can be the same amounts just described for the catalyst. Typically, the amount of rate modifier is less than 0.01 or 0.005 wt. % based on the total amount of cyclic olefin.

The (e.g. adhesive) composition further comprises a polymer. In some embodiments, the polymer thickens the liquid (e.g. adhesive) composition. In other embodiments, the polymer can be characterized as an adhesion promoter. The polymer is typically combined with the first part of the composition containing the unpolymerized cyclic olefin. However, the second part may also contain polymer provided that the polymer is unreactive with respect to the catalyst.

In some embodiments, the composition further comprises an adhesion promoter. The adhesion promoter is typically combined with the first part of the composition containing the unpolymerized cyclic olefin. However, the second part may also contain adhesion promoter provided that the adhesion promoter is unreactive with respect to the catalyst.

In some embodiments, the adhesion promoter is a compound or polymer containing at least two isocyanate groups. The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In some embodiments, the adhesion promoter is a diisocyanate compound, or mixtures of diisocyanate compounds.

In some embodiments, the adhesion promoters are polymeric polyisocyanates (e.g. diisocyanate) such as polyisocyanate prepolymers available from Covestro including the trade designations DESMODUR E-28 (MDI based) and Baytec ME-230 (modified MDI based on polytetramethylene ether glycol (PTMEG). Such polymeric polyisocyanates (e.g. diisocyanates) comprise C2-C4 alkylene oxide repeat units. Such polymeric polyisocyanates (e.g. diisocyanates) are typically the reaction product of a polyether polyol and a polyisocyanate (e.g. diisocyanate). Further, such polymeric polyisocyanates typically have an average equivalent weight ranging from 200-5000 g/mole per isocyanate group.

In some embodiments, the polymeric isocyanate adhesion promoter is typically the reaction product of a polyol and aliphatic diisocyanate such as MDI. The polyol typically has one or more oxygen atoms in the backbone such as in the case of polytetramethylene ether glycol and polypropylene oxide.

In some embodiments, the (e.g. polytetramethylene ether glycol) polyol has a molecular weight of about 90 g/mol. Such polymeric isocyanate may have a NCO content of greater than 15, 16, 17, 18, 19, or 20 wt. %. The NCO content is typically no greater than 25 wt. %.

In some embodiments, the (e.g. polypropylene oxide) polyol has a molecular weight of at least 1000, 1100, 1200, 1300, 1400, 1500, 1600, 1700, 1800, 1900, or 2000 g/mol. The amount of polymerized polyol is typically less than 55, 50, 45, or 40 wt. % of the polymeric isocyanate. Such polymeric isocyanate may have a NCO content of greater than 10, 11, 12, 13, 14, or 15 wt. %. The NCO content is typically no greater than 20 wt. %. The equivalent weight of the polymeric polyol can be less than 400, 350, or 300 g/mole/NCO group. The equivalent weight is typically at least 150, 200 or 250 g/mole/NCO group.

In some embodiments, the composition may comprise a maleic anhydride grafted polymer as an adhesion promoter such as available under the trade designation "POLYVEST MA 75" from Evonik, Essen, Germany and under the trade designation "RICON 131 Maleinized Polybutadiene 131MA10" from Cray Valley, Exton, PA. In this embodiment, the polymers may be characterized as polyolefins. The polyolefins may be unsaturated, comprising alkene moieties, such as polybutadiene. Unlike styrenic block copolymers, the olefin polymers lack polystyrene blocks.

In some embodiments, the polyolefin adhesion promoters have an average anhydride equivalent weight ranging from 200-5000 g/mole per anhydride group. In some embodiments, the average anhydride equivalent weight ranging is no greater than 4000, 3000, 2000, 1000 or g/mole per anhydride group.

In some embodiments, the polyolefin adhesion promoters have an average silicone-containing moiety functionality of greater than 1 or 1.5. In some embodiments, the average silicone-containing moiety functionality ranges up to 2.5. The adhesion promoters may be characterized as an alkoxysilane terminated polyolefin such as di or tri (C1-C4) alkoxysilane-terminated polybutadiene. Triethoxysilane-terminated liquid polybutadiene is commercially available from Evonik.

The (e.g. polymeric polyisocyanate or olefin polymer comprising maleic anhydride or silicone-containing moieties) adhesion promoter is a liquid, typically having a viscosity at 20 or 25° C. of at least 2000, 3000, 4000, or 5000 mPas. (DIN EN ISO 3219). In some embodiments, the viscosity at 20 or 25° C. is no greater than 75,000 mPas. In some embodiments, the viscosity is no greater than 30,000, 25,000, 20,000, or 15,000 or 10,000 mPas. In some embodiments, the viscosity is less than 1000 or 500 mPas. In other embodiments, the adhesion promoter may have a viscosity of at least 50,000; 75,000; 100,000; 125,000 or 150,000 mPas at 45, 50, or 55° C. The viscosity is indicative of the molecular weight. Liquid adhesion promoters can be combined with the liquid unpolymerized cyclic olefin more easily than solids, resulting in the adhesion promoter being more uniformly dispersed within the mixture.

The adhesion promoter is polymeric i.e. having a backbone with (e.g. polyether or polyolefin) repeat units. In typical embodiments, the polymeric adhesion promoter has a molecular weight (Mn) of no greater than 10,000; 9,000; 8,000; 7,000; or 6,000 g/mole. In some embodiments, the polymeric adhesion promoter has a molecular weight (Mn) of no greater than 5,000; 4,500; 4,000; 3,500; or 3,000 g/mole. In some embodiments, the polymeric adhesion promoter has a molecular weight (Mn) has a molecular weight of at least 1000, 1100, 1200, 1300, 1400, 1500, 1600, 1700, 1800, 1900, or 2000 g/mole.

The adhesion promoter polymers as described herein can be used in combination with additional adhesion promoters described in the art.

When a polyolefin adhesion promoter with maleic acid and/or silicone-containing moieties is utilized, the adhesion promoter and overall composition may be free of isocyanate moieties.

In some embodiments, the additional adhesion promoter is an aliphatic diisocyanate. Aliphatic diisocyanates comprise a linear, branched, or cyclic saturated or unsaturated hydrocarbon group typically containing 1 to about 24 carbon atoms. In some embodiments, the alkyl diisocyanate contains at least 2, 3, 4, 5, or 6 carbon atoms. In some embodiments, the aliphatic diisocyanate contains no greater than 22, 20, 18, 16, 14, or 12 carbon atoms. Representative examples include hexamethylene diisocyanate (HDI), octamethylene diisocyanate, decamethylene diisocyanate, and the like. In some embodiments, the aliphatic diisocyanate comprises a cycloaliphatic (e.g. cycloalkyl) moiety, typically having 4 to 16 carbon atoms, such as cyclohexyl, cyclooctyl, cyclodecyl, and the like. In one embodiments, the cycloalkyl diisocyanate is isophorone diisocyanate (IPDI) and the isomers of isocyanato-[(isocyanatocyclohexyl) methyl]cyclohexane ($H_{12}MDI$).

In some embodiments, the additional adhesion promoter is an aromatic diisocyanate. Aromatic diisocyanates include one or more aromatic rings that are fused together or covalently bonded with an organic linking group such as an alkylene (e.g. methylene or ethylene) moiety. Representative aromatic moieties include phenyl, tolyl, xylyl, napthyl, biphenyl, diphenylether, benzophenone, and the like. Suitable aromatic diisocyanates contain 6 to 24 carbon atoms, such as toluene diisocyanates, xylene diisocyanate, xylylene diisocyanate, tetramethylxylylene diisocyanate (TMXDI), and methylene diphenyl diisocyanate (MDI), that may comprise any mixture of its three isomers, 2.2'-MDI, 2,4'-MDI, and 4,4'-MDI.

Other polymeric isocyanates include for example PM200 (poly MDI), Lupranate™ (poly MDI from BASF), various isocyanate terminated polybutadiene prepolymers available from Cray Valley including Krasol™ LBD2000 (TDI based), Krasol™ LBD3000 (TDI based), Krasol™ NN-22 (MDI based), Krasol™ NN-23 (MDI based), and Krasol™ NN-25 (MDI based).

In some embodiments, the additional adhesion promoter is a maleic-anhydride grafted styrene-ethylene/butylene-styrene hydrogenated copolymer, typically comprising at least 0.1, 0.2, 0.3, 0.4 or 0.5 wt. % of grafted maleic anhydride. The amount of grafted maleic anhydride is typically no greater than 7, 6, 5, 4, 3, or 2 wt. %. Maleic-anhydride grafted styrene-ethylene/butylene-styrene hydrogenated copolymers typically comprise at least 10 and no greater than 60, 50, or 40% polystyrene. Suitable functional elastomers are commercially available from Kraton Performance Polymers as the trade designations "Kraton FG1901G" and "Kraton FG1924G". The amount of (e.g. functional) elastomer when present in typically at least 0.001, 0.05, or 0.1 wt. % based on the weight of the cyclic olefin.

The (e.g. adhesive) composition typically comprises at least 0.005, 0.010, 0.050, 0.10, 0.50, or 1 wt. % of adhesion promoter based on the total weight of the composition. In some embodiments, the amount of adhesion promoter is no greater than 10, 9, 8, 7, 6, 5, 4, 3, 2, or 1 wt. % of the total weight of the composition. In some embodiments, the adhesion promoter comprises one or more polymeric polyisocyanate (e.g. diisocyanate) comprising oxygen atoms in the backbone. In some embodiments, the adhesion promoter comprises one or more polyolefins comprising maleic anhydride moieties. In some embodiments, the adhesion promoter comprises at least one polymeric polyisocyanate (e.g. diisocyanate) comprising oxygen atoms in the backbone and at least one polyolefin comprising maleic anhydride moieties. When two adhesion promoters are used, the amount of each adhesion promoter is typically less than 5, 4, 3, 2, or 1 wt. % of the total weight of the composition.

The (e.g. adhesive) compositions may optionally contain one or more conventional additives. Preferred additives include tackifiers, plasticizers, antioxidants, UV stabilizers, colorants (e.g. carbon black) and inorganic fillers such as (e.g. fumed) silica, (e.g. phlogopite) mica and glass and ceramic bubbles; as well as (e.g. polyolefin (e.g. polyethylene) and fluoropolymer) organic polymeric filler and inorganic fibers.

In some embodiments, the (e.g. adhesive) composition comprises an organic and/or inorganic filler in an amount no greater than 10 wt. % of the total (e.g. adhesive) composition. In other embodiments, the amount of organic and/or inorganic filler is greater than 10, 15, 20, 25, 30, 25, 40, 45, or 50 wt. % of the total (e.g. adhesive) composition. The total amount of organic and/or inorganic filler is typically no greater than 75, 70, 65, 50, or 45 wt. % of the total (e.g. adhesive) composition. In some embodiments, the total amount of organic and/or inorganic filler is no greater than 35, 30, or 25 wt. % of the total (e.g. adhesive) composition.

In some embodiments, the filler comprises particles having various shapes such as spherical, ellipsoid, linear or branched.

In some embodiments, the filler particles typically have mean primary particle size of at least 1, 2, 3, 4, 5, 6, 7, 8, 9, or 10 microns. In some embodiments, the filler particles have a mean particle size less than 1 micron. In other embodiments, the filler particles have a mean primary particle size of at least 15, 20, 25, 30, 35, 40, 45, or 50 microns. The filler primary particle size is typically no greater than 250, 200, 150, or 100 microns. Smaller filler particles can be amenable to higher filler concentration. Smaller filler particles are also less likely to hinder the flow of the adhesive through the dispensing nozzle of the cartridge. The filler particles may comprise a normal distribution of particle sizes having a single peak or a distribution of particles having two or more peaks. "Primary particle size" refers to the mean diameter of a single (non-aggregate, non-agglomerate) particle.

In some embodiments, the filler is combined with the unpolymerized cyclic olefin of the first part. Thus, the first chamber of the cartridge comprises the filler. In this embodiment, the second chamber comprising dispersant and catalyst may be free of filler. In other embodiments, the dispersant comprises a non-thixotropic filler as will subsequently be described.

Various organic and inorganic non-thixotropic fillers are known in the art. Representative examples include glass or ceramic microspheres, and fluoropolymer particles. Combinations of non-thixotropic filler may be utilized. Non-thixotropic fillers typically have a spherical shape.

When the dispersant comprises filler, the amount of non-thixotropic filler is typically at least 0.5, 1, 1.5, 2, 2.5, 3, 3.5, 4, 4.5, or 5 vol. % of the total volume of the second part. In some embodiments, the amount of non-thixotropic filler is at least 10, 15, 20, 25, or 30 vol. % of the total volume of the second part. The total amount of non-thixotropic filler is typically no greater than 75, 70, 65, 60, 55, or 50 vol. % of the total volume of the second part. In some embodiments, the total amount of non-thixotropic filler is typically no greater than 45, 40, 35, 30, 25, 20, 15, or 10 vol. % of the total volume of the second part.

Small concentrations of non-thixotropic filler may be present when the liquid or semi-solid hydrocarbon material of the dispersant alone is of sufficient viscosity to prevent catalyst sedimentation. Higher concentrations of non-thixotropic filler may be present when the liquid or semi-solid hydrocarbon of the dispersant alone is not of sufficient viscosity to prevent catalyst sedimentation. Further, higher concentrations of non-thixotropic filler may also be present when the volume of the second part is higher. For example, when the first chamber of the cartridge has a volume of 10 parts and the second chamber has a volume of 1 part, the second part is less than 10% of the total volume of the composition. However, when the volume ratio of the first part to the second part is less than 10:1, e.g. no greater than 9:1, 8:1, 7:1, 6:1, 5:1, or 4:1, the volume of the second part is a greater amount of the total composition (e.g. for 4:1, the second part is ⅕=20% of the total composition). It has been that found higher concentrations (e.g. 20%) of liquid or semi-solid hydrocarbon material can result in lower overlap shear values. However, the inclusion of filler in the second part can advantageously offset the decrease in overlap shear values.

In some embodiments, the adhesive composition comprises (e.g. non-thixotropic) fluoropolymer particles. The fluoropolymer particles may be present in the first part, the second part, or both the first and second part.

Lower concentrations of fluoropolymer particles can thicken the catalyst dispersant and improve flow. Higher concentrations of fluoropolymer particle can improve mechanical properties such as abrasion resistance and/or lower the dielectric constant and dielectric loss of the composition. The dielectric properties can be determined with test methods known in the art, such as the test method described in PCT/US2020/058660; incorporated herein by reference.

In typical embodiments, the flurorpolymer particles are crystalline fluoropolymer particles. A variety of crystalline fluoropolymer particles may be employed including mixtures of different crystalline fluoropolymer particles. The crystalline fluoropolymer particles typically have high crystallinity and therefore a significant melting point (peak maximum) as determined by differential scanning calorimetry in accordance with DIN EN ISO 11357-3:2013-04 under nitrogen flow and a heating rate of 10° C./min. Thus, the fluoropolymer particles are typically thermoplastic.

For example, the crystalline fluoropolymer particles may include particles of fluoropolymers having a Tm of at least 100, 110, 120, or 130° C. In some embodiments, the crystalline fluoropolymer particles may include particles of fluoropolymers having a Tm no greater than 350, 340, 330, 320, 310 or 300° C.

The crystalline fluoropolymer particles typically have a fluorine content greater than about 50 weight percent. Also, the fluoropolymer particles may include particles of fluoropolymers having a fluorine content between about 50 and about 76 weight percent, between about 60 and about 76 weight percent, or between about 65 and about 76 weight percent.

Representative crystalline fluoropolymers include, for example, perfluorinated fluoropolymers such as 3M™ Dyneon™ PTFE Dispersions TF 5032Z, TF 5033Z, TF 5035Z, TF 5050Z, TF 5135GZ, and TF 5070GZ; and 3M™ Dyneon™ Fluorothermoplastic Dispersions PFA 6900GZ, PFA 6910GZ, FEP 6300GZ, THV 221, THV 340Z, and THV 800.

Other suitable fluoropolymer particles are available from suppliers such as Asahi Glass, Solvay Solexis, and Daikin Industries and will be familiar to those skilled in the art.

Commercial aqueous fluoropolymer dispersion usually contain non-ionic and/or ionic surfactants at concentration up to 5 to 10 wt. %. These surfactants are substantially removed by washing the coagulated blends. A residual surfactant concentration of less than 1, 0.05, or 0.01 wt. % may be present. Quite often it is more convenient to use the "as polymerized" aqueous fluoropolymer-latexes as they do not contain such higher contents of non-ionic/ionic surfactants.

As previously described, the crystalline fluoropolymers have a melt point that can be determined by DSC. Crystallinity depends on the selection and concentration of polymerized monomers of the fluoropolymer. For example, PTFE homopolymers (containing 100% TFE-units) have a melting point (Tm) above 340° C. The addition of comonomers, such as the unsaturated (per)fluorinated alkyl ethers, reduces the Tm. For example, when the fluoropolymer contains about 3-5 wt. % of polymerized units of such comonomer, the Tm is about 310° C. As yet another example, when the fluoropolymer contains about 15-20 wt. % of polymerized units of HFP, the Tm is about 260-270° C. As yet another example, when the fluoropolymer contains 30 wt. % of polymerized units of (per)fluorinated alkyl ethers (e.g. PMVE) or other comonomer(s) that reduce the crystallinity the fluoropolymer no longer has a detectable melting point via DSC, and thus is characterized as being amorphous.

In some embodiments, the crystalline fluoropolymer particles contain at least 40, 45, 50, 55, 60, 65, 70, 75, 80, 85, 90, 95 or about 100 wt. % of polymerized units of TFE. The fluoropolymer particles typically have a greater amount of polymerized units of TFE than the crosslinked fluoropolymer. More typically the crystalline fluoropolymer particles contain at least 85, 90, 95 or about 100 wt. % of polymerized units of TFE. Further, the crystalline fluoropolymer particles typically comprise a lower concentration of unsaturated (per)fluorinated alkyl ethers (e.g. PMVE) than the amorphous flurorpolymer. In typical embodiments, the crystalline fluoropolymer particles contain less than 30, 25, 20, 15, 14, 13, 12, 11, 10, 9, 8, 7, 6, or 5 wt. % of polymerized units of (per)fluorinated alkyl ethers (e.g. PMVE).

In some embodiments, the crystalline fluoropolymers are copolymers formed from the constituent monomers known as tetrafluoroethylene ("TFE"), hexafluoropropylene ("HFP"), and vinylidene fluoride ("VDF," "VF2,"). The monomer structures for these constituents are shown below:

TFE: $CF_2=CF_2$ (1)

VDF: $CH_2=CF_2$ (2)

HFP: $CF_2=CF-CF_3$ (3)

In some embodiments, the crystalline fluoropolymer consists of at least two of the constituent monomers (HFP and VDF), and in some embodiments all three of the constituents monomers in varying amounts.

The Tm depends on the amounts of TFE, HFP, and VDF. For example, a fluoropolymer comprising about 45 wt. % of polymerized units of TFE, about 18 wt. % of polymerized units of HFP, and about 37 wt. % of polymerized units of VDF has a Tm of about 120° C. As yet another example, a fluoropolymer comprising about 76 wt. % of polymerized units of TFE, about 11 wt. % of polymerized units of HFP, and about 13 wt. % of polymerized units of VDF has a Tm of about 240° C. By Increasing the polymerized units of HFP/VDF, while reducing the polymerized units of TFE, the fluoropolymer becomes amorphous. An overview of crystalline and amorphous Fluoropolymers is described by Ullmann's Encyclopedia of Industrial Chemistry ($7^{th}$ Edition, 2013 Wiley-VCH Verlag. 10. 1002/14356007.a11 393 pub 2) Chapter: Fluoropolymers, Organic.

In some embodiments, the adhesive composition comprises (e.g. non-thixotropic) glass or ceramic microspheres. The microspheres may be hollow or fused. Hollow glass microspheres may be characterized as glass bubbles. Glass bubbles are typically sufficiently low in density such that at least 90% of the glass bubbles float in water (having a specific gravity of 1 g/cc).

The (e.g. glass bubble) filler typically has a density ranging from 0.125 to 0.60 g/cc. In some embodiments, the density is at least 0.15, 0.20, 0.25, 0.30, or 0.35 g/cc. In some embodiments, the density is no greater than 0.55, 0.50, 0.45, 0.40 g/cc.

The glass microspheres (e.g. bubbles) may be prepared from soda lime borosilicate glass. In this embodiment, the glass may contain about 70 percent silica (silicon dioxide), 15 percent soda (sodium oxide), and 9 percent lime (calcium oxide), with much smaller amounts of various other compounds.

The (e.g. glass bubble) filler may have a isostatic crush strength ranging from about 200 to 30,000 psi with a 80%-90% of the glass bubbles remaining intact. In some embodiments, the crush strength is at least 500, 1000, or 2000 psi. In some embodiments, the crush strength is no greater than 25,000; 20,000; 15,000; 10,000; or 5,000 psi.

The (e.g. glass bubble) filler may have a dielectric constant ranging from 1.2 to 2 at 100 MHz. In some embodiments, the dielectric constant is no greater than 1.9, 1.8 or 1.7.

The (e.g. glass bubble) filler may have a thermal conductivity of 0.04 to 0.2 W·m−1·K−1 at 21° C.

In some embodiments, the adhesive composition comprises a thixotropic (e.g. inorganic) filler such as fumed silica. Fumed silica is described as microscopic droplets of amorphous silica fused into branched, chainlike, three-dimensional secondary aggregate particles. The secondary aggregate particles can agglomerate into tertiary particles. As used herein "aggregate" particles refers to strongly bonded or fused particles. The forces holding an aggregate together are strong forces, for example covalent bonds, or those resulting from sintering or complex physical entanglement. Agglomerate" refers to a weak association between primary particles which may be held together by charge or polarity and can be broken down into smaller entities. Although agglomerated particles can be broken down into smaller entities such as discrete primary particles such as by application of a surface treatment or by (e.g. low shear) mechanically mixing particles into a liquid, aggregates are typically not broken down and therefore remain present as aggregates.

The particle size of the fumed silica aggregate is typically at least 10 times the primary particle size, as previously described.

In typical embodiments, the desired viscosity of the dispersant is obtained using little or no thixotropic fillers such as fumed silica that typically generates heat during mixing of the components of the second part to avoid prematurely activating the catalyst. Thus, the second part of the (e.g. adhesive) composition typically comprises no greater than 25, 20, 15, 20 and in some embodiments no greater than 5, 4, 3, 2, or 1 wt. % of thixotropic fillers.

In some embodiments, the first part (lacking the catalyst) may contain thixotropic fillers such as fumed silica. In some embodiments, the first part comprises thixotropic filler in an amount of at least 5, 10, 15, 20 or 25 wt-%. In some embodiments, the amount of thixotropic filler of the first part is no greater than 50, 45, 40, 35, 30, 25, 20, 15, 10 wt-%. In some embodiments, the second part of the (e.g. adhesive) composition comprises no greater than 5, 4, 3, 2, or 1 wt. % of thixotropic fillers.

The components of the first and second part are typically chosen such that each part and the mixture thereof is 100% solids, comprising little or no volatile organic solvent e.g. less than 5, 4, 3, 2, or 1 wt. % volatile organic solvent.

The (e.g. adhesive) composition can be coated on a substrate using conventional coating techniques. For example, these compositions can be applied to a variety of substrates by methods such as roller coating, flow coating, dip coating, spin coating, spray coating, knife coating, and die coating. Coating (dry) thickness typically ranges from 25 (e.g. about 1 mil) to 1500 microns (60 mils). In some embodiments, the coating thickness ranges from about 50 to 350 microns.

Figure 2:
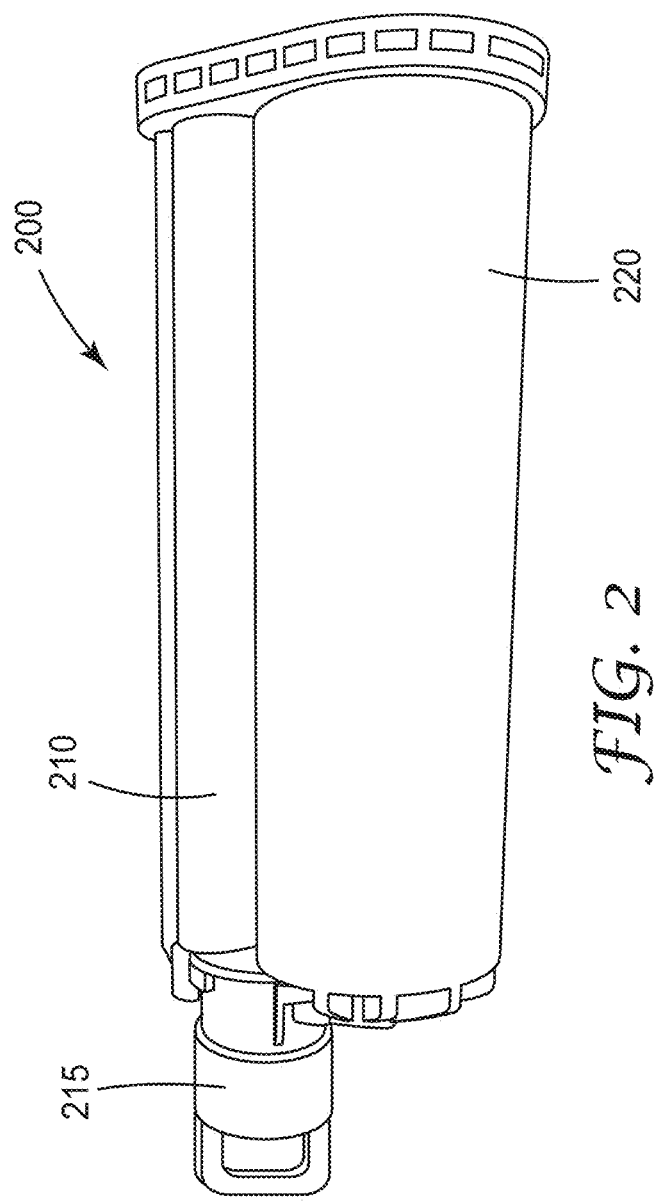
FIG. 2 is a perspective view of a cartridge comprising a two-part composition.

The two-part (e.g. adhesive) compositions described herein can be utilized with cartridges as well as dispensing and mixing apparatus that are currently used for two-part epoxy compositions, such as depicted in FIGS. 1 and 2. Further detail concerning use of such apparatus can be found on the internet. (See for example https://www.youtube.com/watch?v=_TmC8I3YBrc)

FIG. 2 is a schematic diagram of a cartridge comprising a two-part composition. In typical embodiments as shown, the cartridge 200 comprises a first (e.g. cylindrical) chamber 210 and second (e.g. cylindrical) chamber 220 connected to each other as a single cartridge. Alternatively, (not shown) the first and second chamber can be provided as separate cartridges.

The first chamber 210 of the cartridge 200 comprises the unpolymerized cyclic olefin and optionally other components (e.g. adhesion promoters, additives) as previously described. The second chamber 220 of the cartridge 200 comprises a ring opening metathesis polymerization catalyst or precatalyst thereof; and an unreactive dispersant as described herein. The second chamber may also optionally further comprise other components provided the inclusion of such component(s) does not interfere with the reactivity of the catalyst with the unpolymerized cyclic olefin after storage as previously described.

The chambers of the cartridge are typically pre-filled with the two-component (e.g. adhesive) composition. Prior to use the chambers are sealed from exposure to air with a cap 215. In typical embodiments, the catalyst is sufficiently dispersed in the unreactive dispersant for a sufficient period of time (e.g. up to 1 year or greater) such that the cartridge is ready to use as received.

The first chamber 210 and second chamber 220 typically have a volume ranging from 1:1 to 20:1. In some embodiments, the first chamber and second chamber have a volume ratio of at least 2:1, 3:1, or 4:1. In some embodiments, such as depicted in FIG. 2, the first chamber and second chamber have a volume ratio less than 20:1 such as 15:1 or 10:1.

Figure 3:
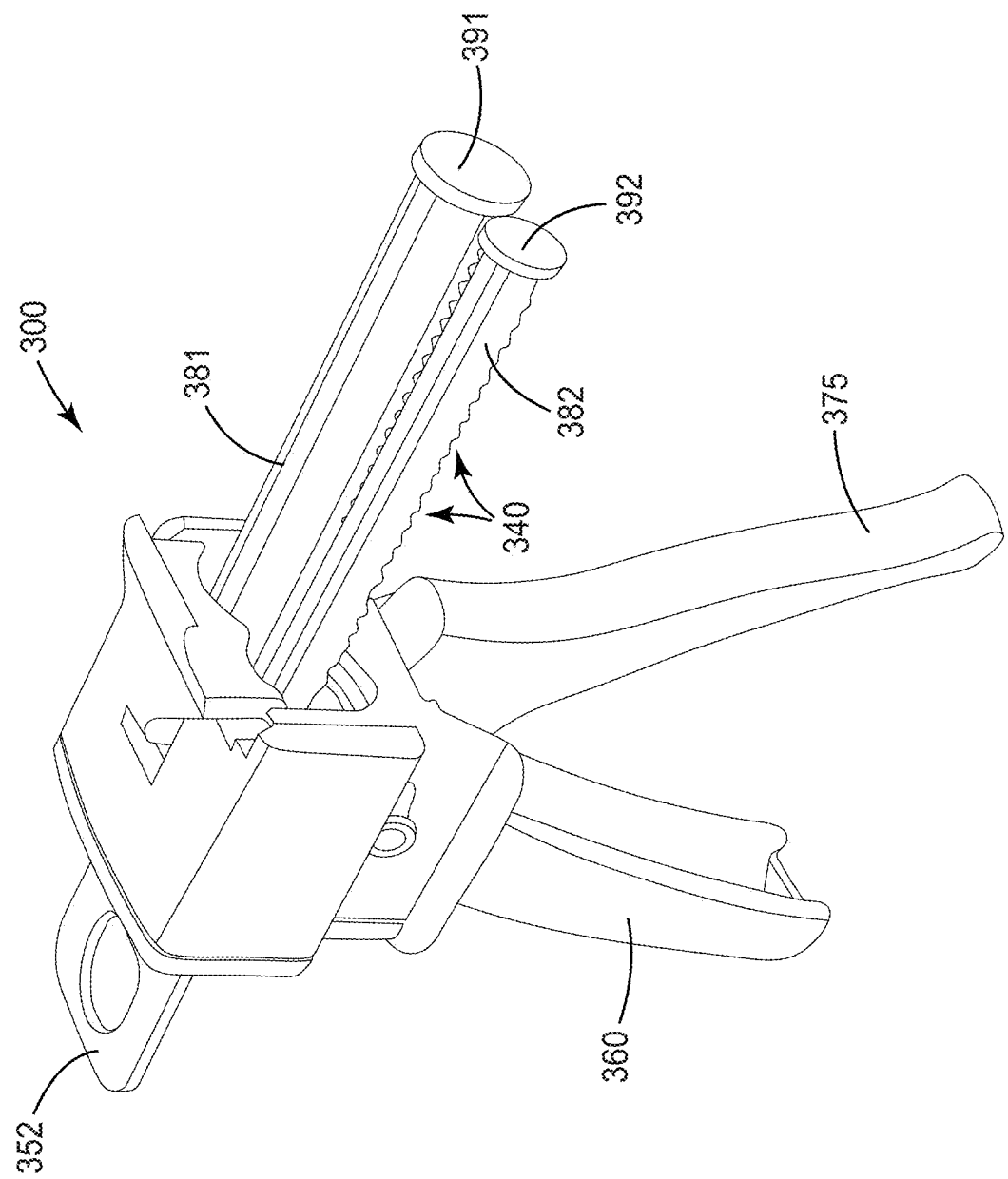
FIG. 3 is a photograph of an apparatus for mixing and dispensing a two-part composition.

FIG. 3 is a schematic diagram of an illustrative apparatus for mixing and dispensing a two-part composition commercially available as the trade designation "3M™EPX Plus II Epoxy Applicator". The apparatus comprises a dispensing gun 300 including a handle 360 and trigger 375. The dispensing gun further comprises a first plunger rod 381 and a second plunger rod 382. One end of each plunger rod is of suitable size and shape (e.g. cylindrical) to correspond with the cross-sectional size and shape of the respective chambers. Thus, with respect to the illustrative 10:1 cartridge, plunger end 391 is suitable for dispensing the first part of the composition from the first chamber of the cartridge and plunger end 392 is suitable for dispensing the second part of the composition from the second chamber cartridge. The plunger rods may further include evenly spaced teeth 340 for stepwise engaging the plunger toward the front end of the cartridge. Inclusion of a stepwise engaging member is useful for dispensing a pre-determined amount of the two-part composition and is also amendable for preventing applying an excessive amount. The opposing ends of the plunger rods are connected as a unitary structure having a back end 352. The back end may be adapted to facilitate gripping the end between one's thumb and index finger.

As illustrated in the previously cited video, during use the back end 352 is pulled such that ends (391 and 392) of plunger rods are inside the gun. Cartridge 300 is loaded into the gun such that the ends (391 and 392) of the plunger rods are adjacent to their respective chambers of the cartridge. The cap 215 is removed from the cartridge and a dispensing (e.g. mixer) nozzle (not shown) is removably attached in place of the cap. In typical embodiments, the nozzle rotatably attaches to the cartridge using the same threads as the cap and may be characterized as a twist-lock connection. Alternatively, the nozzle may be attached with a bell-mount connection. The dispensing nozzle typically further comprises a static mixer element within the nozzle. Various nozzles are commercially available including 3M™ Mixing Nozzles, 3M™ Static Mixing Nozzles, and 3M™ Scotch-Weld™ EPX Mixing Nozzles.

During use of the mixing and dispensing apparatus, the handle 360 is grasped with one's thumb and trigger 375 is depressed toward the handle 360 with one's fingers causing the plunger rods to move towards the dispensing nozzle. Such movement causes the contents of the first and second chamber to be conveyed through the dispensing nozzle containing the static mixer element, such that the mixed components of the first and second chamber exit the outlet of the nozzle tip.

In typical embodiments, polymerization occurs after applying the (e.g. adhesive) composition to a substrate.

The (e.g. adhesive) composition may be coated upon a variety of flexible and inflexible substrates. Examples include for example plastic films such as polyolefins (e.g. polypropylene, polyethylene), polyvinyl chloride, polyester (polyethylene terephthalate), polycarbonate, polymethyl (meth)acrylate (PMMA), cellulose acetate, cellulose triacetate, and ethyl cellulose. In some embodiments, the substrate is comprised of a bio-based material such as polylactic acid (PLA).

Substrates may also be prepared of fabric such as woven fabric formed of synthetic or natural fibrous materials such as cotton, nylon, rayon, glass, ceramic materials, and the like or nonwoven fabric such as air laid webs of natural or synthetic fibers or blends of these.

The substrate may also be formed of metal (e.g. steel, aluminum, copper), metalized polymer films, ceramic sheet materials, or foam (e.g., polyacrylic, polyethylene, polyurethane, neoprene), and the like.

Advantageously, the described adhesion promoters are suitable for bonding to substrates that are notoriously difficult to bond to engineered plastics such as polyamide (e.g. nylon 6, nylon 6,6), polyether sulfone (PES), polystyrene (PS), polyphenylene sulfide (PPS), polyether ether ketone (PEEK) polyether imide (PEI). In some embodiments, the engineered plastic has a melting point of at least 150° C. or 200° C. In some embodiments, the engineered plastic has a melting point no greater than 375° C. or 350° C. The melting point of such material is described in Polymer Data Handbook, edited by James E. Mark Oxford University Press (1999). In some embodiments, the substrate is a film, sheet, or (e.g. non-planar) molded plastic article. Such substrates typically lack fibers and thus the adhesive composition forms surface bonds rather than bonds formed by physical entanglement of fibers.

When the cyclic olefin is polymerized with a ROMP catalyst activated by exposure to actinic (e.g. UV) radiation, the composition may be irradiated with activating UV radiation having a UVA maximum at a wavelength range of 280 to 425 nanometers. UV light sources can be of various types. Low light intensity sources, such as blacklights, generally provide intensities ranging from 0.1 or 0.5 mW/cm² (milliwatts per square centimeter) to 10 mW/cm² (as measured in accordance with procedures approved by the United States National Institute of Standards and Technology as, for example, with a UVIMAP UM 365 L-S radiometer manufactured by Electronic Instrumentation & Technology, Inc., in Sterling, VA). High light intensity sources generally provide intensities greater than 10, 15, or 20 mW/cm² ranging up to 450 mW/cm² or greater. In some embodiments, high intensity light sources provide intensities up to 500, 600, 700, 800, 900 or 1000 mW/cm². UV light to polymerize the cyclic olefin(s) can be provided by various light sources such as light emitting diodes (LEDs), blacklights, medium pressure mercury lamps, etc. or a combination thereof. The cyclic olefin(s) can also be polymerized with higher intensity light sources as available from Fusion UV Systems Inc. The UV exposure time for polymerization and curing can vary depending on the intensity of the light source(s) used. For example, complete curing with a low intensity light source can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

Alternatively or in combination thereof, when the cyclic olefin is polymerized with a thermally activated ROMP catalyst, the (e.g. adhesive) is heated as previously described.

The adhesive composition is typically not a pressure sensitive adhesive after polymerizing the cyclic olefin. In this embodiment, the storage modulus (G') of the adhesive after polymerizing the cyclic olefin is at least (e.g. 25° C.) $3\times10^5$ Pa at a frequency of 1 Hz. In some embodiments, the adhesive composition has a storage modulus of a least than $4\times10^5$ Pa, $5\times10^5$ Pa, $6\times10^5$ Pa, $7\times10^5$ Pa, $8\times10^5$ Pa, $9\times10^5$ Pa, $1\times10^6$ Pa, $2\times10^6$ Pa, $3\times10^6$ Pa, $4\times10^6$ Pa, $5\times10^6$ Pa or greater after polymerizing the cyclic olefin. In this embodiment, the adhesive composition may be characterized as a structural adhesive composition.

In some embodiments, the polymerizable composition provides a structural or semi-structural adhesive composition in which the composition may be disposed between two substrates and subsequently fully cured to create a structural or semi-structural bond between the substrates. "Semi-structural adhesives" are those cured adhesives that have an overlap shear strength (according to the test method of the examples) of at least about 0.5 MPa, more preferably at least about 1.0 MPa, and most preferably at least about 1.5 MPa. Those cured adhesives having particularly high overlap shear strength, however, are referred to as structural adhesives. "Structural adhesives" are those cured adhesives that have an overlap shear strength of at least about 3.5 MPa, more preferably at least about 5 MPa, and most preferably at least about 7 MPa. The overlap shear strength can be tested according to the test method described in the examples using a crosshead speed of 0.1 or 0.05 inches/min. Various substrates can be utilized for overlap sheer testing including metal (e.g. steel, aluminum, copper,) or engineered plastics such as previously described.

Objects and advantages of this invention are further illustrated by the following examples. The particular materials and amounts, as well as other conditions and details, recited in these examples should not be used to unduly limit this invention.

EXAMPLES

Unless otherwise noted or readily apparent from the context, all parts, percentages, ratios, etc. in the Examples and the rest of the specification are by weight.

TABLE 1

Materials Used in the Examples

| Abbreviation | Description |
|---|---|
| HPR2128 | A monomer resin with <90% dicloperitadiene, obtained under the trade designation "PROXIMA HPR 2128", available from Materia Inc., Pasadena, CA |
| Catalyst | Ruthenium-based ROMP catalyst solution, obtained under trade designations, such as "CT-714", "CT-170" and "CT-762", available from Materia Inc, Pasadena, CA |
| Petrolatum | A semi-solid mixture of hydrocarbons obtained from Spectrum Chemical Mfg. Corp., New Brunswick, NJ |
| A-8000 | A polyester adipate, obtained under the trade designation "PARAPLEX A-8000" from Hallstar Industrial, Chicago, IL |
| 131MA17 | A maleated polybutadiene, obtained under the trade designation "RICON131MA17" from Cray Valley, Exton, PA |
| 131MA10 | A maleated polybutadiene, obtained under the trade designation "RICON131MA10" from Cray Valley, Exton, PA |
| MB10 | A monoester of benzoic acid and isodecyl alcohol, obtained under the trade designation "JAYFLEX MB10" from ExxonMobil, Clinton, NJ |
| J14 | A PTFE filler, obtained under the trade designation "DYNAMAR J14" from 3M, St. Paul, MN average particle size 6 microns |
| Al | Aluminum coupons, obtained under the trade designation, "ALUM SHT 2024 T3" from Ryerson, Minneapolis, MN |
| R8200 | Fumed silica, obtained under the trade designation "AEROSIL R8200" from Evonik, Essen, Germany |
| TS610 | Available from Cabot Corporation under the trade designation "CAB-O-SIL ™ TS-610 Fumed Silica" (surface modified with dimethyl dichlorosilane) |
| ST-M | Silane-terminated linear polybutadiene, obtained under the trade designation "POLYVEST ST-M" from Evonik, Essen, Germany |
| MA75 | Maleic anhydride functionalized linear polybutadiene, obtained under the trade designation "Polyvest MA75" from Evonik, Essen, Germany |
| E-Sphere | Glass beads, obtained under the trade designation "E-SPHERES SL300" from Envirospheres, Lindfield, Australia |
| Mineral Oil | Mineral Oil, light, obtained from Sigma Aldrich |
| Nylon | Nylon 6,6 coupons, obtained from Plastics International, Eden Prairie, MN |
| S32 | Glass bubbles; engineered hollow glass microspheres, obtained under the trade designation "3M GLASS BUBBLES S32" from 3M Company, St. Paul, MN |
| K37 | Glass bubbles; engineered hollow glass microspheres, obtained under the trade designation "3M GLASS BUBBLES K37" from 3M Company, St. Paul, MN |
| S38HS | Glass bubbles; engineered hollow glass microspheres, obtained under the trade designation "3M GLASS BUBBLES S38HS" from 3M Company, St. Paul, MN |
| ME230 | Coupling agent; modified diphenylmethane diisocyanate (MDI)-terminated polyether prepolymer based on polytetramethylene ether glycol (PTMEG) obtained under the trade designation "BAYTEC ME-230" from Covestro, Leverkusen, Germany |

Test Methods

Viscosity Test Method

Samples were run on an ARES G2 Rheometer from TA Instruments (New Castle, DE). Samples were run in cone and plate mode at 25° C. with a 25 mm 0.09896 rad stainless steel cone at a gap of 0.0465 mm. The sample was pre-sheared for 10 seconds at 20 s$^{-1}$ then allowed to equilibrate for 30 seconds. A flow ramp was then run from 20 s$^{-1}$ to 0.2 s$^{-1}$ shear rates in log mode with 20 points recorded over 3 minutes. The results of viscosity measurements are shown in FIG. 1.

DSC Onset Measurement

The stability of the catalysts was evaluated by differential scanning calorimetry (DSC). The stability, and essentially the reactivity, of the catalysts, was characterized by mixing the catalyst formulation with HPR2128 resin to measure the onset temperatures from DSC. The onset temperatures are defined as the intersection of the tangents of the exotherm peak with the extrapolated baseline.

Overlap Shear Adhesion Test (OLS)

The adhesive was mixed via a static mixer nozzle during dispense onto the substrates. Substrates tested included 1×4" coupons of stainless steel, aluminum, cold rolled steel, brass and Kalix (polyacrylamide). For metal substrates except cold rolled steel, the bonding area was grit blasted with alumina grit. Glass spheres (6 mil) were sprinkled on the bond line before mating the substrates to control bond line thicknesses. The two coupons were bonded with a ½ inch overlap. All samples were cured for 30 minutes in an oven at 45° C. Samples were tested on a load frame within 24 hours of curing and after 2 weeks exposure to 60° C./95 rh environmental conditions. The OLS crosshead speed was set to 0.1 inch/min (0.00423 cm/s). The reported value is the average of three samples tested.

Method of Mixing Catalyst with Dispersant

Immediately after shaking the mineral oil catalyst suspension, the mineral oil catalyst suspension and higher viscosity dispersant (petrolatum or polyester adipate—

PARAPLEX A-8000) were weighed into DAC cups and mixed at room temperature in a DAC SpeedMixer at approximately 2000 rpm for 2 minutes.

TABLE 2

Physical stability observations

| Example | | Physical Stability Observation |
|---|---|---|
| CE-1 | Catalyst Dispersed in Mineral Oil (as received) | Sedimentation |
| CE-2 | Catalyst Dispersed in Mineral Oil (redispersed) | Sedimentation in less than 1 hour |
| 1 | Catalyst Dispersed in Mineral Oil:Petrolatum (Weight ratio 10:90) | No sedimentation after 3 months |
| 2 | Catalyst Dispersed in Mineral Oil:Petrolatum (Weight ratio 80:20) | No sedimentation after 3 months |

TABLE 3

DSC onset temperature of HPR2128 mixed with ROMP catalyst dispersed in petrolatum

| Example | Catalyst Dispersed in Mineral Oil:Petrolatum Weight Ratio | HPR2128:Cat. Ratio | Volume of HPR2128:Volume of Catalyst and Dispersant | DSC Onset Temperature (° C.) Before Storage | DSC Onset Temperature (° C.) After 3-month Storage |
|---|---|---|---|---|---|
| 3 | 20:80 | 50:1 | 10:1 | 48 | 50 |
| 4 | 8:92 | 50:1 | 4:1 | 60 | 61 |
| 5 | 4:96 | 50:1 | 2:1 | 66 | 66 |
| 6 | 2:98 | 50:1 | 1:1 | 75 | 76 |

Evaluation of Polyester Adipate (Trade Designation PARAPLEX A-8000) as a ROMP Dispersant

TABLE 4

Physical stability observations of catalyst packages with polyester adipate PARAPLEX A-8000

| Example | | Physical Stability Observation |
|---|---|---|
| CE-3 | Catalyst Dispersed in Mineral Oil:PARAPLEX A-8000 (Weight ratio 20:80) | No sedimentation after 3 months |

TABLE 5

DSC onset temperature of HPR2128 mixed with catalyst packaged in polyester adipate PARAPLEX A-8000

| Example | Catalyst Dispersed in Mineral Oil:PARAPLEX A-8000 Weight Ratio | HPR2128:Catalyst Ratio | Volume of HPR2128:Volume of Catalyst and Dispersant | DSC Onset Temperature (° C.) Before Storage | DSC Onset Temperature (° C.) After 3-month Storage |
|---|---|---|---|---|---|
| CE-3 | 20:80 | 50:1 | 10:1 | 50 | None (No exothermic peak from 25° C. to 200° C.) |

TABLE 6

Formulations for Adhesion Tests

| | EX-7 (wt. %) | Ex. 8A (wt. %) | Ex. 8B (wt. %) |
|---|---|---|---|
| Material Part A | | | |
| HPR2128 | 50.5 | 50.5 | 50.5 |
| 131MA17 | | 2.7 | 2.7 |
| 131MA10 | 2.7 | | |
| MB10 | 2.8 | 2.8 | 2.8 |
| J14 | 44 | 44 | 34 |
| Material Part B | | | |
| ROMP Catalyst Dispersed in Mineral Oil | 20 | 20 | 5 |
| Petrolatum | 80 | 80 | 85 |
| J14 | | | 10 |

*Part A was charged in the 10 part side of a 10:1 dual cartridge. Part B was charged in the 1 part side the cartridge.

The viscosity of Part B of Ex. 8B, measured at 25° C. and a shear rate of 1 1/s was 180 Pa·sec.

TABLE 7

Adhesion Test Results of EX-7

| Substrate | Condition | OLS (psi) |
|---|---|---|
| Stainless steel | initial | 1014 |
| | 2 weeks 60° C./95 rh | 2073 |
| Al | Initial | 729 |
| | 2 weeks 60° C./95 rh | 1271 |
| CRS | Initial | 34 |
| | 2 weeks 60° C./95 rh | 209 |
| Brass | Initial | 575 |
| | 2 weeks 60° C./95 rh | 714 |

TABLE 8

Adhesion Test Results of EX-7

| Substrate | Condition | OLS (psi) |
|---|---|---|
| Stainless steel | Initial | 2229 |
| | 2 weeks 60° C./95 rh | 2899 |
| Al | Initial | 1983 |
| | 2 weeks 60° C./95 rh | 2861 |
| CRS | Initial | 1895 |
| | 2 weeks 60° C./95 rh | 2834 |
| Brass | Initial | 1319 |
| | 2 weeks 60° C./95 rh | 2126 |
| Kalix | Initial | 606 |

Test Methods

Overlap Shear Adhesion (OLS) Test Method II

Aluminum coupons (1 inch×4 inches by 0.08 inches; 2.5 cm×10.2 cm×0.2 cm) were used. At the tip of one coupon, a 1 inch×0.5 inch (2.5 cm×1.3 cm) area was coated with a thin layer of the prepared formulation with a tongue depressor, and then contacted with another coupon in the opposite tip direction. Paper clamps were used to hold the two halves together during the curing process. The samples were then cured in an oven at the temperatures and times indicated in the tables below.

The OLS crosshead speed was set to 0.1 inch/minute (0.00423 cm/second). The reported value is the "peak stress" of the average of at least three samples tested.

Formulation Preparation Procedure II

The monomer side (Material Part A) consisted of monomer (HPR2128), fumed silica (R8200) and optionally, surface coupling agents. The catalyst side (Material Part B) consisted of the catalyst in mineral oil (CT-170), and various subsets of glass bubbles (S32, K37, S38HS), surface coupling agents (ST-M, ME230, MA75), mineral oil, petrolatum and/or fumed silica (R8200). The materials of either side were weighed out in speedmixer cups and mixed at 3500 revolutions per minutes (rpm) for 30 seconds. Then the correct amounts from either side were weighed out in a third speedmixer cup and mixed at 3500 rpm for 30 seconds.

TABLE 9

One-part Formulation including Petrolatum

| Material | Density, g/cm³ | EX-9, Vol % (wt. %) |
|---|---|---|
| ST-M | 0.90 | 5.4 (4.6) |
| R8200 | 3.00 | 5.6 (15.9) |
| HPR2128 | 0.98 | 68.9 (63.5) |
| CT-170 | 0.84 | 1.9 (1.5) |
| Petrolatum | 0.85 | 18.1 (14.5) |
| Total, Vol % | | 100.0 |
| Substrate | | Al |
| Cure Temperature, ° C. | | 150 |
| Cure Time, minutes | | 60 |
| OLS, psi (MPa) | | 1781 (12) |

TABLE 10

One-part Comparative Formulation (CE-4)

| Material | Density, g/cm³ | CE-4, Vol % (wt. %) |
|---|---|---|
| R8200 | 3.00 | 7.2 (19.3) |
| HPR2128 | 0.98 | 87.8 (76.7) |
| ST-M | 0.93 | 3.9 (3.2) |
| CT-170 | 0.84 | 1.1 (0.8) |
| Total, Vol % | | 100 |
| Cure Temperature, ° C. | | 150 |
| Cure Time, minutes | | 120 |
| OLS, psi (MPa) | | 3502 (24) |

TABLE 11A

4 (Part A):1 (Part B) Formulations

| Material | Density, g/cm³ | EX-10, Vol % (wt. %) | EX-11, Vol % (wt. %) | EX-12, Vol % (wt. %) | EX-13, Vol % (wt. %) | EX-14, Vol % (wt. %) | EX-15, Vol % (wt. %) |
|---|---|---|---|---|---|---|---|
| Material Part A | | | | | | | |
| R8200 | 3.00 | 6.0 (17.7) | 6.0 (17.9) | 6.0 (17.7) | 6.0 (17.7) | 6.0 (17.6) | 6.0 (17.6) |
| HPR2128 | 0.98 | 74.0 (71.0) | 74.0 (71.4) | 74.0 (70.6) | 74.0 (70.6) | 74.0 (70.5) | 74.0 (70.3) |
| Material Part B | | | | | | | |
| ST-M | 0.93 | 6.9 (6.3) | 5.4 (4.9) | 6.8 (6.2) | 5.7 (5.1) | 6.9 (6.9) | 5.5 (4.9) |
| CT-170 | 0.84 | 1.8 (1.5) | 1.7 (1.4) | 1.8 (1.4) | 1.8 (1.4) | 1.8 (1.5) | 1.8 (1.4) |
| Mineral Oil | 0.84 | | 0.5 (0.4) | | 1.2 (1.0) | | |
| Petrolatum | 0.85 | | | | | | 2.5 (2.0) |
| S32 | 0.32 | 11.3 (3.6) | 12.4 (3.9) | | | | |
| K37 | 0.37 | | | 11.4 (4.1) | 11.4 (4.1) | | 10.2 (3.4) |

TABLE 11A-continued 4 (Part A):1 (Part B) Formulations

| Material | Density, g/cm³ | EX-10, Vol % (wt. %) | EX-11, Vol % (wt. %) | EX-12, Vol % (wt. %) | EX-13, Vol % (wt. %) | EX-14, Vol % (wt. %) | EX-15, Vol % (wt. %) |
|---|---|---|---|---|---|---|---|
| S38HS | 0.38 | | | | | 11.3 (4.2) | |
| Total, Vol % | | 100.0 | 100.0 | 100.0 | 100.0 | 100.0 | 100.0 |
| Cure Temperature, ° C. | | 150 | 150 | 150 | 150 | 150 | 150 |
| Cure Time, minutes | | 120 | 120 | 120 | 120 | 120 | 60 |
| OLS, psi (MPa) | | 3527 (24) | 3395 (23) | 3497 (24) | 3610 (25) | 3254 (22) | 2906 (20) |

The results show that high overlap shear values can be obtained when Part B further comprises a non-thixotropic filler such as glass bubbles. The overlap shear values are comparable to the one-part composition of CE-4.

TABLE 11B

Part B Volume and Weight Percent

| Material | Density, g/cm³ | EX-10, Vol % (wt. %) of Part B | EX-11, Vol % (wt. %) of Part B | EX-12, Vol % (wt. %) of Part B | EX-13, Vol % (wt. %) of Part B | EX-14, Vol % (wt. %) of Part B | EX-15, Vol % (wt. %) of Part B |
|---|---|---|---|---|---|---|---|
| Material Part B | | | | | | | |
| ST-M | 0.93 | 34.5 (55.3) | 27.0 (46.2) | 34.0 (53.0) | 28.5 (44.0) | 34.5 (54.8) | 27.5 (41.9) |
| CT-170 | 0.84 | 9.0 (13.2) | 8.5 (13.2) | 9.0 (12.0) | 9.0 (12.1) | 9.0 (11.9) | 9.0 (12.0) |
| Mineral Oil | 0.84 | | 2.5 (3.7) | | 6.0 (8.6) | | |
| Petrolatum | 0.85 | | | | | | 12.5 (17.1) |
| S32 | 0.32 | 56.5 (31.6) | 62 (36.8) | | | | |
| K37 | 0.37 | | | 57 (35) | 57.0 (35.3) | | 51.0 (29) |
| S38HS | 0.38 | | | | | 56.5 (33.3) | |

TABLE 12

OLS Performance

| | EX-10 with no Aging | EX-10 Aged 1 Week at Room Temperature | EX-10 Aged 1 Week at 4° C. |
|---|---|---|---|
| OLS, psi (MPa) | 3527 ± 150 (240 ± 1) | 3119 ± 109 (22 ± 1) | 3293 ± 501 (23 ± 3) |

TABLE 13A

1:4 Formulation with the Surface Coupling Agent in Part A

| Material | Density, g/cm³ | EX-16, Vol % (wt. %) |
|---|---|---|
| Material Side A | | |
| ST-M | 0.93 | 1.7 (4.9) |
| R8200 | 3.00 | 5.9 (16.8) |
| HPR2128 | 0.98 | 72.4 (67.1) |
| Material Side B | | |
| CT-170 | 0.84 | 1.8 (1.4) |
| Petrolatum | 0.90 | 7.7 (6.2) |
| K37 | 0.37 | 10.5 (3.7) |
| Total, Vol % | | 100.0 |
| Cure Temperature, ° C. | | 150 |
| Cure Time, minutes | | 60 |
| OLS, psi (MPa) | | 2816 (19) |

TABLE 13B

Part B Volume and Weight Percent

| Material | Density, g/cm³ | EX-16, Vol % (wt. %) of Part B |
|---|---|---|
| Material Side B | | |
| CT-170 | 0.84 | 9.0 (12.4) |
| Petrolatum | 0.90 | 38.5 (54.9) |
| K37 | 0.37 | 52.5 (32.7) |
| Total, Vol % | | 100.0 |

TABLE 14

Physical observations

| | | | Viscosity, Pa · s | |
|---|---|---|---|---|
| Example | Physical | Stability Observation | Shear rate of 1 sec⁻¹ at 25° C. | Shear rate of 10 sec⁻¹ at 25° C. |
| EX-16 | Catalyst dispersed in glass bubbles and petrolatum | No sedimentation after 4 months at 4° C. | 163 | 52 |
| CE-4 | Catalyst dispersed in mineral oil and 2% fumed silica (TS610) | | 0.42 | 0.10 |

What is claimed is:

1. A cartridge for a dispensing and mixing apparatus comprising:
    a first chamber comprising unpolymerized cyclic olefin; and
    a second chamber comprising:
        a ring opening metathesis polymerization catalyst or precatalyst thereof; and an unreactive dispersant having a viscosity of at least 10 Pa·sec at 25° C. and a shear rate of 1 1/sec.

2. The cartridge of claim 1 wherein the dispersant is shear thinning.

3. The cartridge of claim 1 wherein the dispersant has a viscosity of at least 15, 20, 25, 30, 35, 40, 45, 50, 55, 60, 65, 70, or 75 Pa·sec at 25° C. and a shear rate of 1 1/sec.

4. The cartridge of claim 1 wherein the dispersant has a viscosity of at least 15, 20, 25, 30, 35, or 40 Pa·sec at 25° C. and a shear rate of 10 1/sec.

5. The cartridge of claim 1 wherein the viscosity at 25° C. of the dispersant at 1 1/sec divided by the viscosity at 10 1/sec is at least 1.5, 2, 2.5, 3, or 3.5.

6. The cartridge of claim 1 wherein a reaction of the unpolymerized cyclic olefin with the ring opening metathesis polymerization catalyst or precatalyst thereof and unreactive dispersant has an onset temperature that differs by no more than 10° C. after storage for 3 months at 25° C. as compared to a same composition not subject to storage.

7. The cartridge of claim 1 wherein the unreactive dispersant has a weight average molecular weight of at least 750 g/mol.

8. The cartridge of claim 1 wherein the unreactive dispersant has a polydispersity of at least 1.20.

9. The cartridge of claim 1 wherein the unreactive dispersant comprises a liquid or semi-solid hydrocarbon.

10. The cartridge of claim 1 wherein the unreactive dispersant comprises petrolatum optionally in combination with mineral oil.

11. The cartridge of claim 1 wherein the unreactive dispersant further comprises a non-thixotropic filler.

12. The cartridge of claim 1 wherein the unreactive dispersant comprises a mixture of non-thixotropic filler and liquid or semi-solid hydrocarbon such that the mixture has a viscosity of at least 10 Pa·sec at 25° C. and a shear rate of 1 1/sec.

13. The cartridge of claim 12 wherein the liquid or semi-solid hydrocarbon has a viscosity of less than 10 Pa·sec at 25° C. and a shear rate of 1 1/sec.

14. The cartridge of claim 1 wherein the unpolymerized cyclic olefin comprises moieties selected from cyclopentadiene, norbornene, or oligomers thereof.

15. The cartridge of claim 1 wherein the unpolymerized cyclic olefin; a ring opening metathesis polymerization catalyst or precatalyst thereof; and a hydrocarbon dispersant is an adhesive composition when combined.

16. The cartridge of claim 1 wherein the first chamber and second chamber have a volume ratio ranging from 1:1 to 20:1.

17. The cartridge of claim 1 wherein the first chamber and second chamber have a volume ratio ranging from 1:1 to 5:1.

18. The cartridge of claim 1 wherein the first chamber and second chamber are connected to each other as a single cartridge or the first chamber and second chamber are separate cartridges.

19. A two-part composition comprising:
    a first part comprising a unpolymerized cyclic olefin; and
    a second part comprising:
        a ring opening metathesis polymerization catalyst or precatalyst thereof; and
        an unreactive dispersant having a viscosity at 25° C. of at least 10 Pa·sec at a shear rate of 1 1/sec.

20. A composition comprising:
    a ring opening metathesis polymerization catalyst or precatalyst thereof; and
    an unreactive dispersant having a viscosity at 25° C. of at least 10 Pa·sec at a shear rate of 1 1/sec.

* * * * *